United States Patent
Zhu et al.

(10) Patent No.: US 7,271,865 B2
(45) Date of Patent: Sep. 18, 2007

(54) GENERAL FILM COMPENSATED REFLECTIVE TWISTED NEMATIC LIQUID CRYSTAL DISPLAY

(75) Inventors: Xinyu Zhu, Orlando, FL (US); Shin-Tson Wu, Oviedo, FL (US)

(73) Assignees: Research Foundation of the University of Central Florida, Inc., Orlando, FL (US); Toppoly Optoeleetronics Corps., Miao-Li County (TW)

( * ) Notice: Subject to any disclaimer, the term of this patent is extended or adjusted under 35 U.S.C. 154(b) by 361 days.

(21) Appl. No.: 11/002,711

(22) Filed: Dec. 2, 2004

(65) Prior Publication Data

US 2006/0119769 A1 Jun. 8, 2006

(51) Int. Cl.
*G02F 1/1335* (2006.01)
(52) U.S. Cl. .................................... 349/113; 349/114
(58) Field of Classification Search .............. 349/113, 349/114
See application file for complete search history.

(56) References Cited

U.S. PATENT DOCUMENTS

| | | | |
|---|---|---|---|
| 5,847,789 A | 12/1998 | Nakamura et al. ............ 349/99 |
| 5,993,207 A | 11/1999 | Spencer ...................... 433/18 |
| 6,204,904 B1 | 3/2001 | Tillin et al. ................. 349/119 |
| 6,384,885 B1 | 5/2002 | Kim et al. ................... 349/113 |
| 6,407,787 B1 | 6/2002 | Sekime et al. ............. 349/119 |
| 6,480,251 B1 | 11/2002 | Yamaguchi et al. ........ 349/119 |
| 6,552,767 B1 | 4/2003 | Kaneko ...................... 349/119 |
| 6,577,364 B1 | 6/2003 | Tillin et al. ................. 349/119 |
| 6,654,093 B1 | 11/2003 | Kim .......................... 349/179 |
| 6,697,134 B2 | 2/2004 | Watanabe et al. ........... 349/102 |
| 6,791,640 B1* | 9/2004 | Okamoto et al. ........... 349/113 |
| 6,853,421 B2* | 2/2005 | Sakamoto et al. .......... 349/114 |
| 2002/0171792 A1* | 11/2002 | Kubota et al. ............. 349/114 |
| 2004/0246418 A1* | 12/2004 | Kumagai et al. ........... 349/117 |
| 2005/0174515 A1* | 8/2005 | Tung et al. ................. 349/114 |

* cited by examiner

*Primary Examiner*—Huyen Ngo
(74) *Attorney, Agent, or Firm*—Brian S. Steinberger; Phyllis K. Wood; Law Offices of Brian S. Steinberger, P.A.

(57) ABSTRACT

A general film compensated reflective twisted nematic liquid crystal display, device, system and method with phase compensation film set to compensate the residual phase retardation of the liquid crystal in the voltage-on state to increase the contrast ratio at a lower operating voltage and decrease the color dispersion when used in reflective and transflective liquid crystal displays. The phase compensation film set is selected based on the twist angle and the residual retardation of the liquid crystal layer, wherein the compensation film set has an effective film phase retardation value and effective polarizer angle to cancel the total residual phase to obtain an excellent dark state for achieving the high contrast ratio.

22 Claims, 22 Drawing Sheets

Effective slow axis angle θ of the compensation film set (degree)

Effective slow axis angle θ of the compensation film set (degree)

GENERAL FILM COMPENSATED REFLECTIVE TWISTED NEMATIC LIQUID CRYSTAL DISPLAY

This invention relates to reflective liquid crystal displays and, in particular, to a method, system, apparatus and device for using phase compensation film set to compensate the liquid crystal layer residual phase retardation at the voltage-on state to increase the contrast ratio at a lower operating voltage.

BACKGROUND AND PRIOR ART

Reflective liquid crystal display (LCD) has several advantages over conventional transmissive LCD including low power consumption, light weight and good outdoor readability. In the beginning, people extended the conventional transmissive twisted-nematic (TN) LCD and super-twisted-nematic (STN) LCD to reflective display by replacing one of the polarizer with a reflective polarizer. In such a simple case, the incident light passes though the polarizer four times in total, resulting in a low light efficiency. What's more, since the reflective polarizer is placed outside the glass substrate, a serious parallax problem occurs when viewing from an oblique angle, which greatly affects the display quality, especially for high resolution reflective LCDs.

In order to solve the above mentioned parallax and low light efficiency issues, many reflective LCDs with a single polarizer have been proposed. The basic configuration of these reflective LCD includes a polarizer, a liquid crystal layer and a reflector. Since light is reflected back by the reflector and incident light passes through the polarizer twice, a reflective LCD with a single polarizer is equivalent to a transmissive LCD with a two-parallel-polarizer configuration, except for double passes of light in the liquid crystal layer. However, the conventional transmissive 90° TN-LCD does not work for the single-polarizer reflective LCD because the wave guiding effect leads to the same states for both voltage-on and voltage-off states.

In principle, the phase retardation (dΔn) of a single-polarizer reflective LCD should be around half that of a transmissive LCD because of the double passes of light. U.S. Pat. No. 5,933,207 issued to Wu on Aug. 3, 1999, which is incorporated by reference, discloses a mixed mode twisted-nematic (MTN) to solve the problems by using a polarizer, a quarter-wave film, a TN-LC layer and a reflector for direct-view display. It works very well with 90° MTN cell because of complete boundary compensation at voltage-on state, although the maximum light efficiency is only 88%. However, when the twist angle is less than 90°, the contrast ratio decreases because boundary compensation is incomplete.

U.S. Pat. No. 6,295,109 issued to Kubo et al. on Sep. 25, 2001 which is incorporated by reference, discloses using a λ/4-α film to compensate the residual phase at the voltage-on state, where α is the residual phase of the TN-LC cell at the voltage-on state. However, since the residual phase in the voltage-on state is not a pure birefringence effect, the λ/4-α film can not compensate the residual phase completely.

In addition to these two patents, use of reflective LCD mode with a single polarizer is disclosed in a monograph by S. T. Wu and D. K. Yang, "Reflective Liquid Crystal Displays", Wiley, New York (2001). The critical issue existing in the above cited arts is that the incomplete boundary compensation results in low contrast ratio for reflective and transflective LCDs.

SUMMARY OF THE INVENTION

A primary objective of the invention is a new method, system, apparatus and device to provide a reflective LCD with high contrast ratio.

A secondary objective of the invention is a new method, system, apparatus and device to provide a reflective LCD with low operating voltage.

A third objective of the invention is a new method, system, apparatus and device to provide a new reflective LCD with high brightness and weak color dispersion.

A forth objective of the invention is a new method, system, apparatus and device to provide a new transflective LCD with high contrast ratio and low driving voltage by using a general film compensation concept.

The method, system, apparatus and device of the present invention advances the art by significantly increasing the contrast ratio of reflective and transflective twisted-nematic LCDs at a lower operating voltage, lowering the color dispersion and increasing the brightness by including at least one compensation film based on the twist angle and the total residual retardation of the twisted nematic liquid crystal layer, wherein the at least one compensation film has an effective film phase retardation value and an effective relative polarizer angle in reference to the effective slow axis angle θ to cancel the total residual retardation of the twisted nematic liquid crystal layer at voltage-on state to obtain an excellent dark state for achieving a high contrast ratio.

A preferred embodiment of reflective liquid crystal display can include a top substrate having a compensation film set and a linear polarizer laminated thereon on the outer surface, a bottom substrate having a reflector means laminated thereon on the inner surface, a first alignment film with a first rubbing direction coated on the inner surface of the top substrate, a second alignment film with a second rubbing direction coated on the reflector means, a twisted nematic liquid crystal layer sandwiched between the top substrate and the reflector means. In the display the twisted nematic liquid crystal layer contacts with both the first alignment layer and the second alignment layer, wherein the twisted nematic liquid crystal layer has a twist angle φ at voltage-off state and has a residual phase retardation a on each boundary at the voltage-on state; and wherein the compensation film set has an effective phase retardation value δ and an effective slow axis direction θ in reference to the first rubbing direction of the top substrate, and the compensation film set herein is used to compensate the boundary residual phase retardation of the twisted nematic liquid crystal layer at voltage-on state to improve a contract ratio of the The compensation film set can include plural uniaxial retardation films with their slow axes parallel to their film surfaces thereof, wherein the plural uniaxial retardation films are approximately equivalent to an effective compensation film with its effective slow axis parallel to the effective compensation film surface thereof.

The effective phase retardation δ of the compensation film set is in the range of $(\delta_0 - 0.27\pi) \leq \delta \leq (\delta_0 + 0.27\pi)$ with $\delta_S$ can satisfy the equation (a):

$$\delta_0 = a\tan\left(\frac{\sin^2\phi + \cos2\alpha\cos^2\phi}{\sin\alpha\sin2\theta\sin2\phi + \sin2\alpha\cos2\theta\cos^2\phi}\right), \quad (a)$$

where the effective slow axis angle θ of the compensation film set is in the range of $0° \leq \theta \leq 180°$.

The linear polarizer forms an angle β in reference to the first rubbing direction of the top substrate and β angle is in the range of $(\beta_0-20°+n\cdot 90°) \leq \beta \leq (\beta_0+20°+n\cdot 90°)$, where n is an integer, with $\beta_0$ can satisfy the equation (b):

$$\beta_0 = \theta + \frac{1}{2}atan\left(-\frac{\sin^2\phi + \cos 2\alpha \cos^2\phi}{\sin\delta_0(\sin\alpha\cos 2\theta\sin 2\phi - \sin 2\alpha\sin 2\theta\cos^2\phi)}\right), \quad (b)$$

where the effective slow axis angle θ of the compensation film set is in the range of $0° \leq \theta \leq 180°$ and $\delta_0$ is obtained from Equation (a).

The twisted nematic liquid crystal layer can include a twist angle ranging from approximately negative 90 degrees to approximately positive 90 degrees, wherein the negative twist angle is a right-handedness twist sense and the positive twist angle is a left handedness twist sense.

The twisted nematic liquid crystal layer can have a retardation value dΔn/λ ranging from approximately 0.25 to approximately 0.60, where d is a thickness of the twisted nematic liquid crystal layer, Δn is a birefringence of the twisted nematic liquid crystal layer material and λ is a central wavelength of an incident light.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

Figure 1:
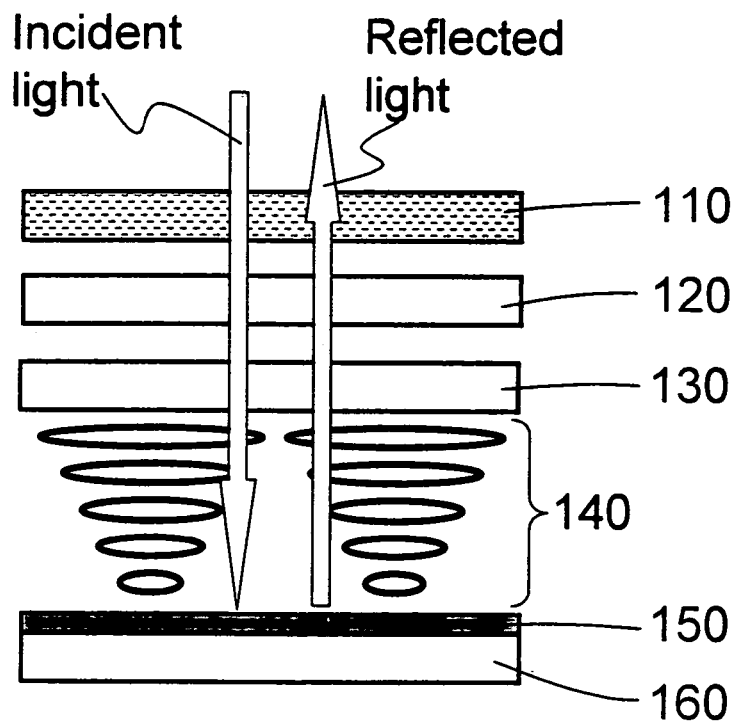
FIG. 1 is a schematic view of the structure of general film compensated reflective twisted nematic liquid crystal display (GF-RTN-LCD) in this invention.

The method, system, apparatus and device of the present invention provides a new structural design for achieving significantly higher contrast ratio, lower color dispersion and higher brightness reflective and transflective LCDs with low driving voltage. FIG. 1 is a schematic diagram of the structure of the general film compensated reflective twisted nematic liquid crystal display (GF-RTN-LCD) in this invention. It includes a top substrate 130, a bottom substrate 160 with a reflector 150 laminated on the inner surface, a polarizer 110, a compensation film set 120 including at least one uniaxial retardation film, and a twisted nematic liquid crystal (TN-LC) layer 140 sandwiched between the top substrate 130 and the reflector 150.

The arrows in FIG. 1 demonstrate the directions of the incoming incident light and the corresponding reflected light. The compensation film set 120 comprises one, two or more uniaixal retardation films and the combination of compensation film set 120 is equivalent to one effective compensation film with an effective phase retardation value and an effective slow axis direction.

Figure 2:
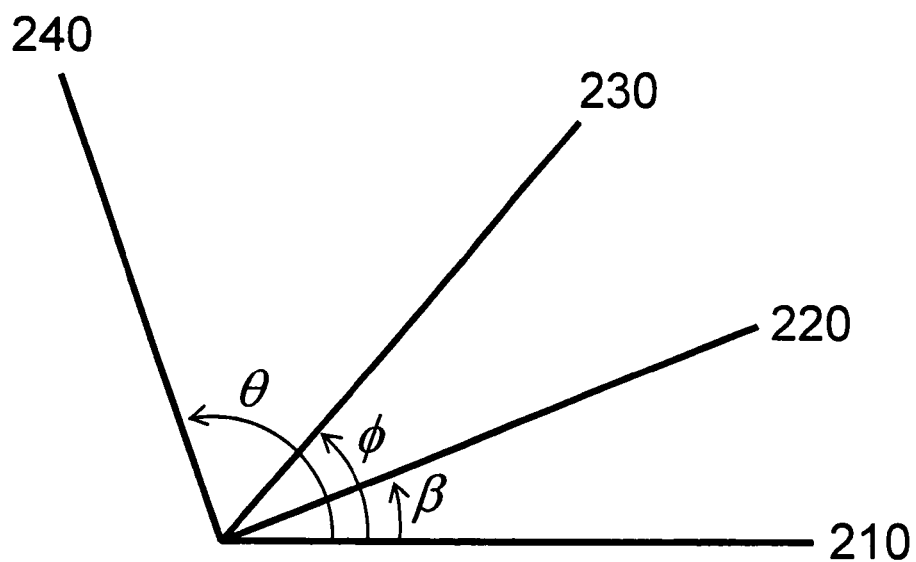
FIG. 2 illustrates the coordinate system of the configuration of GF-RTN-LCD of FIG. 1.

FIG. 2 illustrates the coordinates for the configuration of the GF-RTN-LCD of FIG. 1. Based on the rubbing direction 210 of the top substrate 130 (top substrate 130 refers to the substrate closest to the observer) with the compensation film set 120 and polarizer 110 laminated thereon, the transmission axis 220 of the polarizer 110 is oriented at an angle β and the effective slow axis 240 of the compensation film set 120 is at an angle θ. The twist angle of the TN-LC layer 140, which is the angle between the rubbing direction 210 of the top substrate 130 and the rubbing direction 230 of the reflector 150, is φ. In this example, the angles are defined to be positive in the counter-clockwise direction and negative for the clockwise direction. Therefore, the left-handed twisted-nematic liquid crystal layer has a positive twist angle while the right-handed twisted-nematic liquid crystal layer has a negative twist angle.

Before going to the detailed description of this invention, it is helpful to introduce the two-sublayer model. In a TN-LC cell of the liquid crystal layer with twist angle of φ and positive dielectric anisotropic liquid crystal materials, when a sufficiently high voltage is applied to the liquid crystal layer 340, the middle liquid crystal sublayer 343 is aligned along the electric field direction and is perpendicular to both top substrate 130 and bottom substrate 160, as show in FIG. 3.

However, the boundary layers are hardly disturbed because of the strong surface anchoring. Thus, two thin boundary sublayers 341, 342 are formed at a high voltage state. The top boundary sublayer 341 is located adjacent to the top substrate 130 and the bottom boundary sublayer 342 is adjacent to the reflector means 150. Therefore the on-state LC layer 340 is divided into 3 sublayers at high-voltage state: one middle sublayer 343, one top boundary sublayer 341 and one bottom boundary sublayer 342. Since the middle sublayer 343 is perpendicular to both substrates 130 and 160, this middle sublayer 343 does not affect the polarization state of incident light. Only the top boundary sublayer 341 and the bottom boundary sublayer 342 affect the polarization state of incident light.

The top boundary sublayer 341 and the bottom boundary sublayer 342 located between the reflector 150 and the top substrate 130 can be treated approximately as two uniaxial sublayers with a angle equal to the total twist angle φ. This approximation example is referred to as a two-sublayer model. For a given liquid crystal (LC) material, the residual retardation of each boundary sublayer depends on the driving voltage, the higher the driving voltage, the smaller the residual phase retardation.

Figure 3:
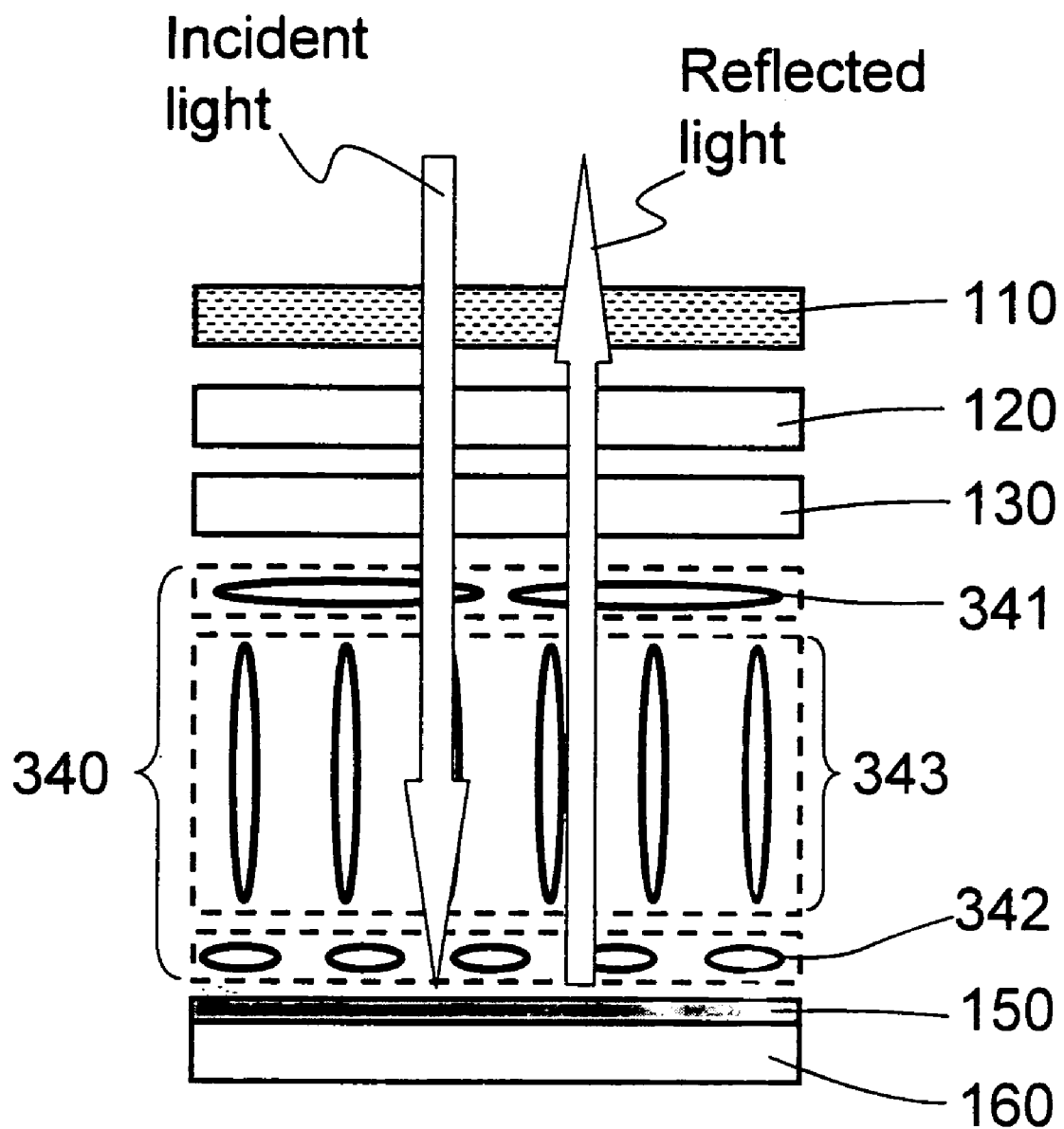
FIG. 3 is a schematic diagram of the two-sublayer model of GF-RTN-LCD at a high voltage state.

Based on the two-sublayer model of FIG. 3, the electro-optic (EO) performance of a GF-RTN-LCD with twist angle φ and positive dielectric anisotropic LC material are analyzed. If the pretilt angles at both substrates are the same, then the residual phase retardation of the top boundary sublayer 341 is equal to that of the bottom boundary sublayer 342 and the total residual phase of the on-state LC layer 340 is 2α. Next, the effective film phase retardation value and the effective polarizer angle are determined to compensate the total residual phase and obtain an excellent dark state for achieving a high contrast ratio.

According to the coordinates system of FIG. 2 and the two-sublayer model of FIG. 3, it is necessary to find the relationship between the following five parameters: (1) the polarizer angle β, (2) the effective slow axis angle θ of the compensation film set 120, (3) the effective phase δ of the compensation film set 120, (4) the twist angle φ of TN-LC layer 140 in FIG. 1 and (5) the residual phase α of each boundary layer 341 or 342.

After applying a mathematical treatment, it is found that in a given reflective TN-LC cell with a twist angle φ and total residual phase 2α at a predesigned voltage-on state, the effective phase δ of the compensation film set 120 is dependent on the effective slow axis angle θ of the compensation film set 120 according to the following equation (1).

$$\delta = a\tan\left(\frac{\sin^2\phi + \cos2\alpha\cos^2\phi}{\sin\alpha\sin2\theta\sin2\phi + \sin2\alpha\cos2\theta\cos^2\phi}\right). \quad (1)$$

Here the "atan" sign means the arc tangent function. From this equation, it is seen that for each effective slow axis angle θ of the compensation film set, there is a required effective compensation film phase retardation value δ. Both θ and θ+n·180° (where n is an integer) are equivalent in determining the effective phase retardation value of the compensation film set.

The range of the angle θ is 0°≦θ≦ approximately 180°. Additionally, the liquid crystal layer twist angles φ and +±approximately 180° are also equivalent in determining the effective phase of the compensation film set. In this example, 2α is the total residual phase of the TN-LC cell and α=2π·ψ/λ is the residual phase of either the top boundary sublayer 341 or the bottom boundary sublayer 342 at the predesigned driving voltage, where ψ is the residual retardation of each boundary sublayer and λ is the wavelength of the incident light. Generally, ψ is in the range of approximately 5 to approximately 50 nm.

After determining the effective phase δ of the compensation film set 120, the effective relative polarizer angle in reference to the effective slow axis angle β-θ is determined. According to the two-sublayer model described above, the effective relative polarizer angle β-θ is expressed as equation (2).

$$\beta - \theta = \frac{1}{2}a\tan\left(-\frac{\sin^2\phi + \cos2\alpha\cos^2\phi}{\sin\delta(\sin\alpha\cos2\theta\sin2\phi - \sin2\alpha\sin2\theta\cos^2\phi)}\right). \quad (2)$$

Similarly, for each effective slow axis angle θ of the compensation film set, the effective relative polarizer angle β-θ is determined, provided that twist angle φ and the residual phase α of each boundary sublayer are given. When determining the effective relative polarizer angle β-θ, it is found that φ and φ±approximately 180° are equivalent. Additionally, β-θ and β-θ+n·90° (n is an integer) are also equivalent due to the periodical property of tangent function.

The results obtained in Equations 1 and 2 are based on the two-sublayer model. In fact, the two-sublayer model is merely an approximate description of the on-state liquid crystal distribution. In the real device, the on-state liquid crystal director distribution is not exactly like the above mentioned two boundary sublayers. Therefore, the actual value of the effective phase retardation $\delta_{actual}$ and the actual value of the effective polarizer angle $\beta_{actual}$ are calculated such that (δ-0.2π)≦$\delta_{actual}$≦(δ+0.2π) and (β-20°+n·90°) ≦$\beta_{actual}$≦(β+20°+n·90°), where n is an integer and δ is determined according to Equation (1) and β is determined according to Equation (2).

The graphs illustrated in FIGS. 4A-4F demonstrate the relationship between the effective phase value δ and the effective slow axis angle θ of the compensation film set for different liquid crystal twist angle φ under three conditions.

Figure 4A:
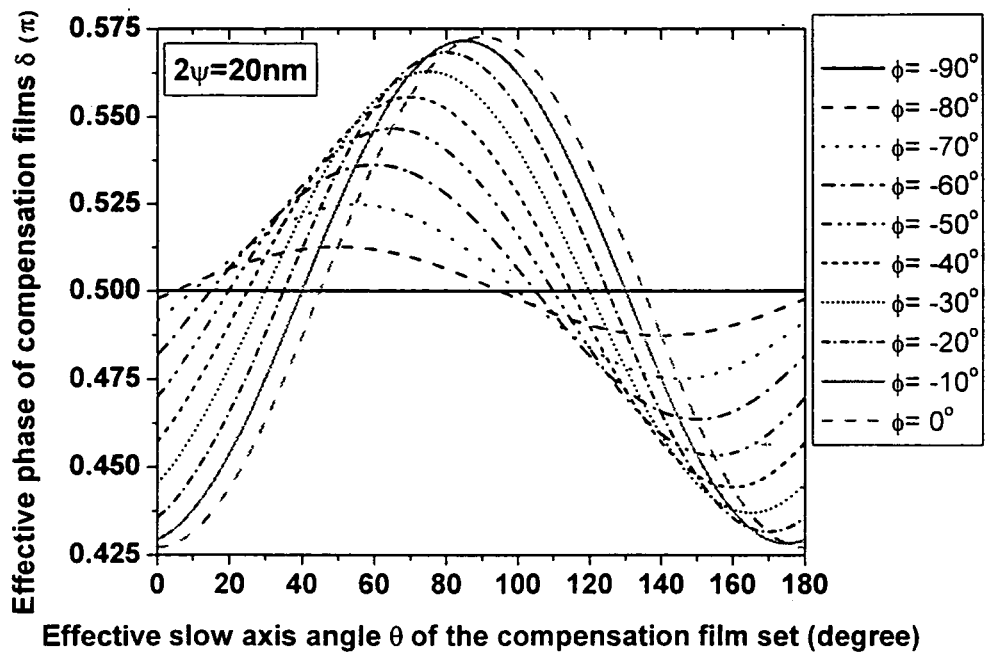
FIG. 4A shows the relationship between the effective phase retardation value δ and the effective slow axis angle θ of the compensation film set of the GF-RTN-LCD in this invention when 2ψ=20 nm and twist φ≦0°.
Figure 4B:
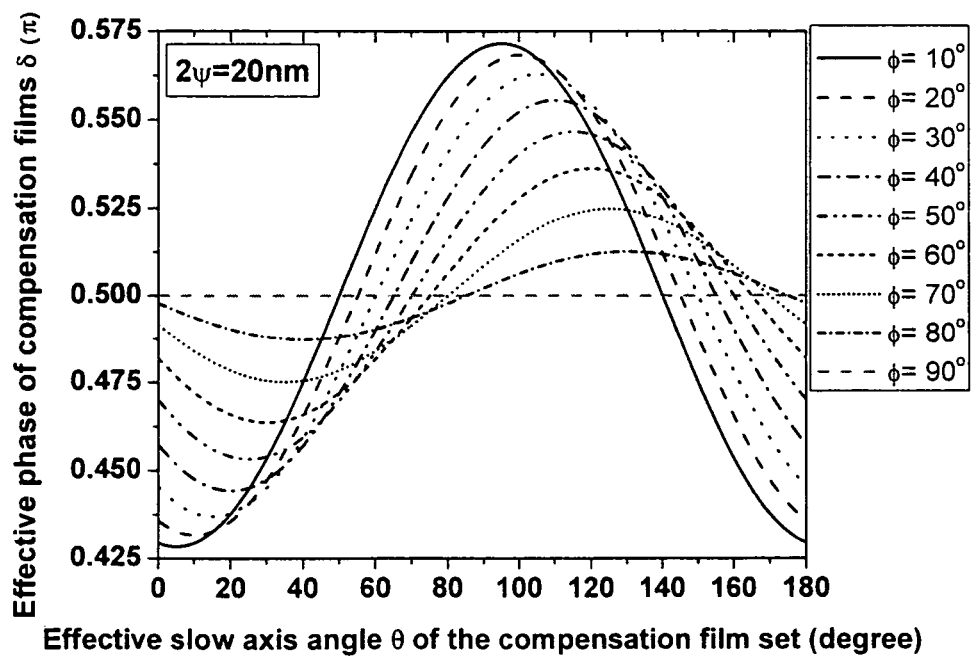
FIG. 4B shows the relationship between the effective phase retardation value δ and the effective slow axis angle θ of the compensation film set of the GF-RTN-LCD in this invention when 2ψ=20 nm and twist φ>0°.
Figure 4C:
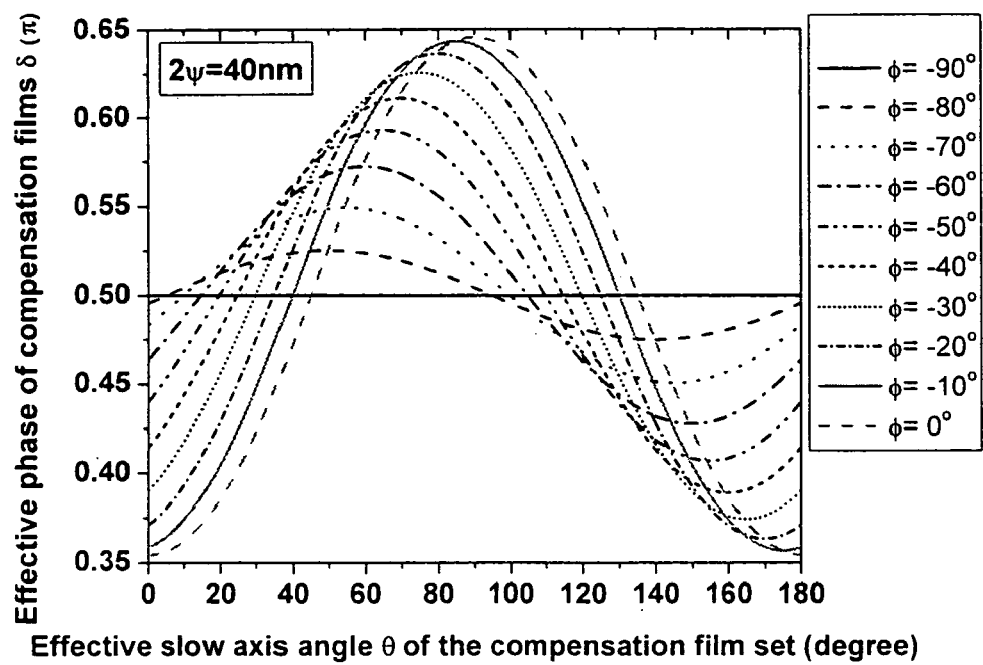
FIG. 4C shows the relationship between the effective phase retardation value δ and the effective slow axis angle θ of the compensation film set of the GF-RTN-LCD in this invention when 2ψ=40 nm and twist φ≦0°.
Figure 4D:
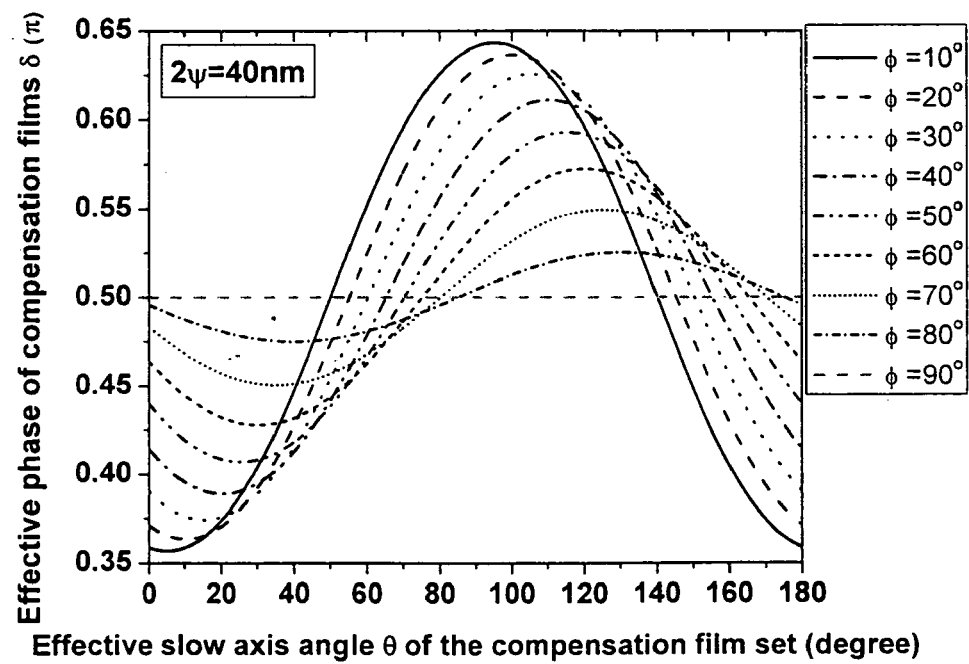
FIG. 4D shows the relationship between the effective phase retardation value δ and the effective slow axis angle θ of the compensation film set of the GF-RTN-LCD in this invention when 2ψ=40 nm and twist φ>0°.
Figure 4E:
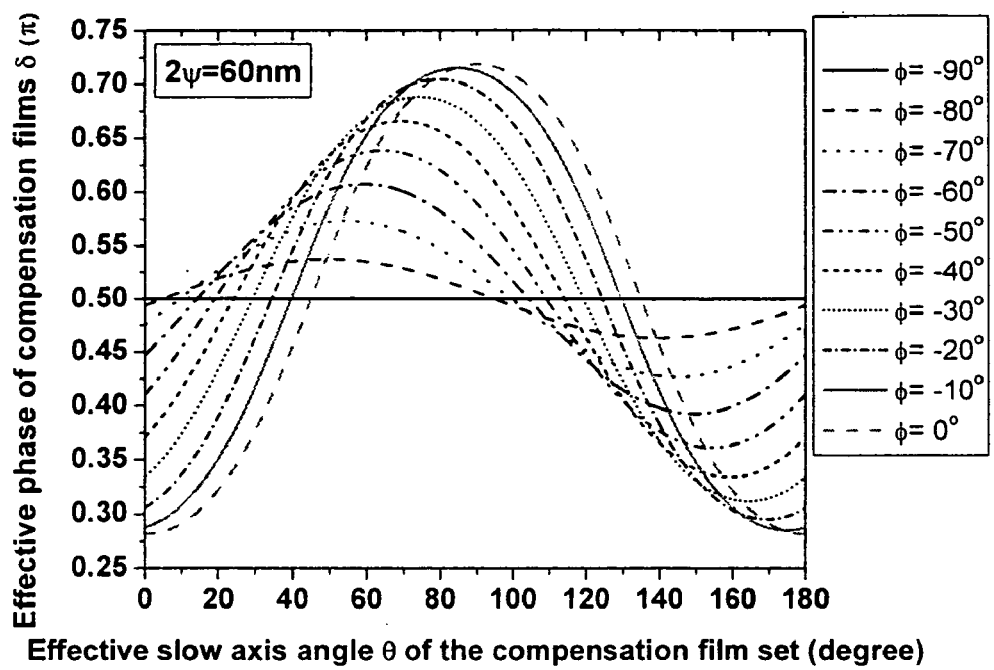
FIG. 4E shows the relationship between the effective phase retardation value δ and the effective slow axis angle θ of the compensation film set of the GF-RTN-LCD in this invention when 2ψ=60 nm and twist φ≦0°.
Figure 4F:
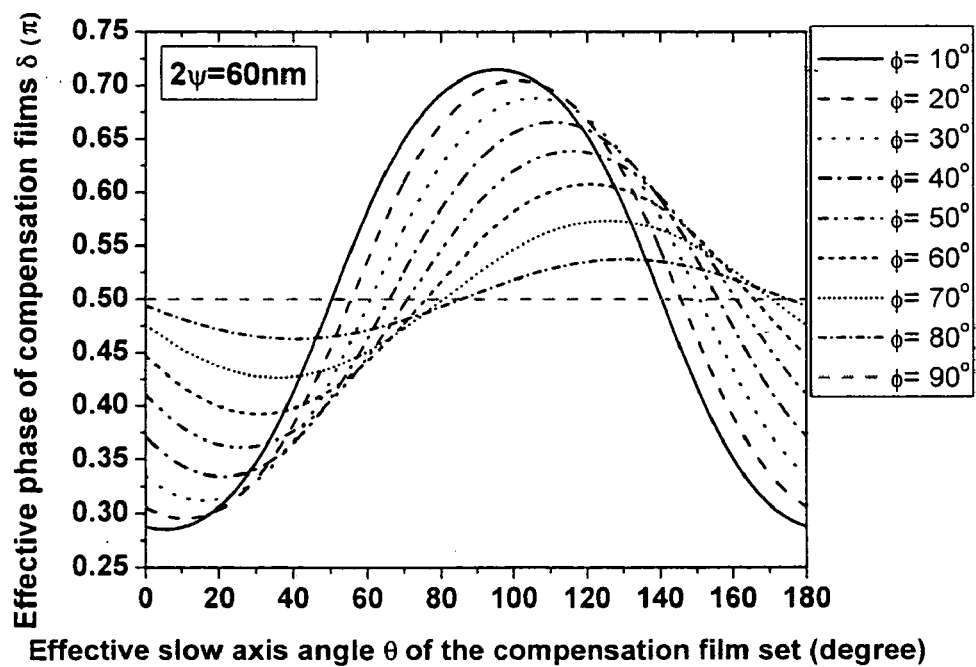
FIG. 4F shows the relationship between the effective phase retardation value δ and the effective slow axis angle θ of the compensation film set of the GF-RTN-LCD in this invention when 2ψ=60 nm and twist φ>0°.

FIGS. 4A and 4B show the relationship for 2ψ=approximately 20 nm, FIGS. 4C and 4D show the relationship for 2ψ=40 nm, and FIGS. 4E and 4F show the relationship for 2ψ=approximately 60 nm. For the special cases where φ=±approximately 90°, the effective compensation film is exactly a quarter-wave film, and for a homogeneous cell (φ=0°), the vibration reaches the maxima. For other twist angles, the effective phase δ of the compensation film set deviates from the quarter-wave film. Comparing FIGS. 4A through 4F, it is apparent that the variation range increases when the total boundary residual retardation increases from approximately 20 nm to approximately 60 nm.

Figure 5A:
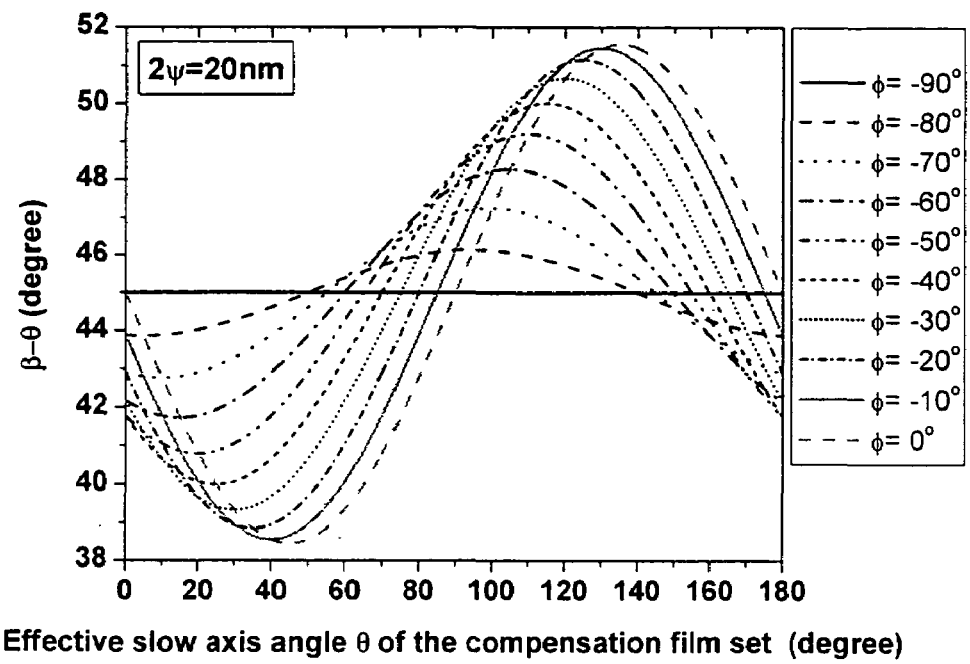
FIG. 5A shows the relationship between the effective relative polarizer angle β-θ and the effective slow axis angle θ of the compensation film set of the GF-RTN-LCD in this invention when 2ψ=20 nm and twist φ≦0°.
Figure 5B:
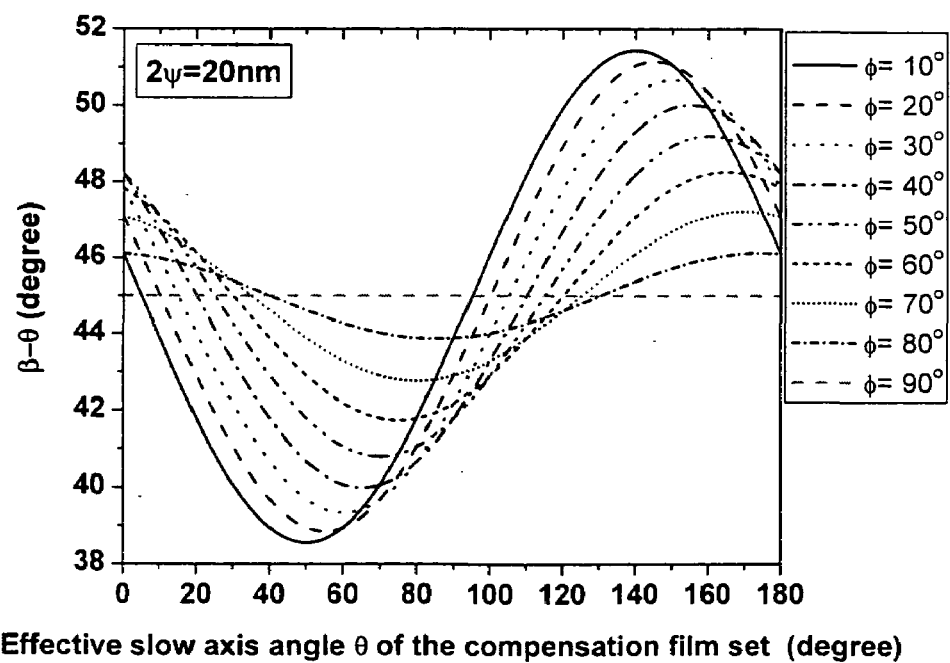
FIG. 5B shows the relationship between the effective relative polarizer angle β-θ and the effective slow axis angle θ of the compensation film set of the GF-RTN-LCD in this invention when 2ψ=20 nm and twist φ>0°.
Figure 5C:
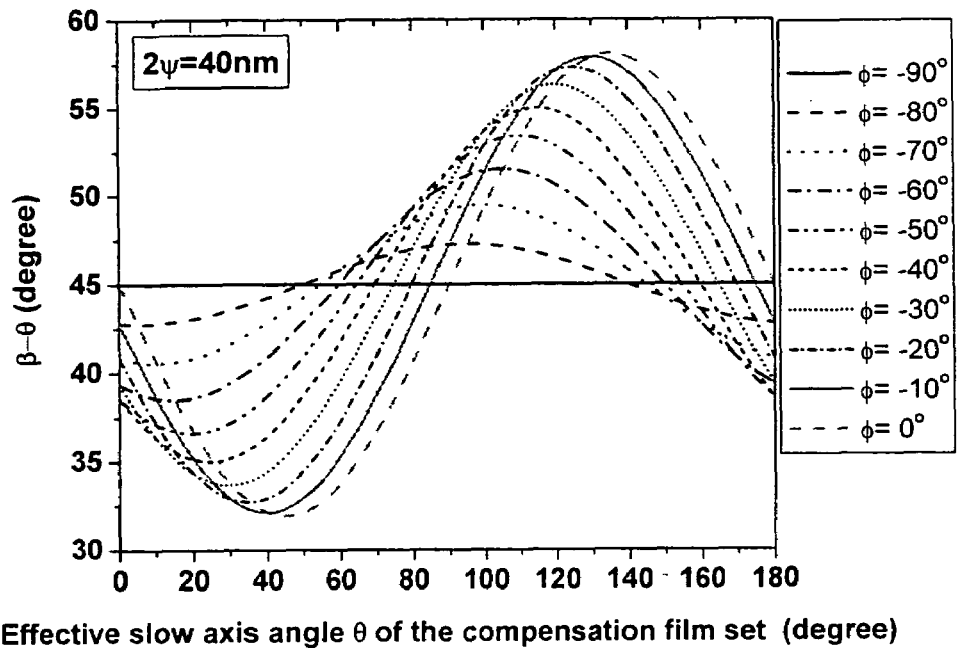
FIG. 5C shows the relationship between the effective relative polarizer angle β-θ and the effective slow axis angle θ of the compensation film set of the GF-RTN-LCD in this invention when 2ψ=40 nm and twist φ≦0°.
Figure 5D:
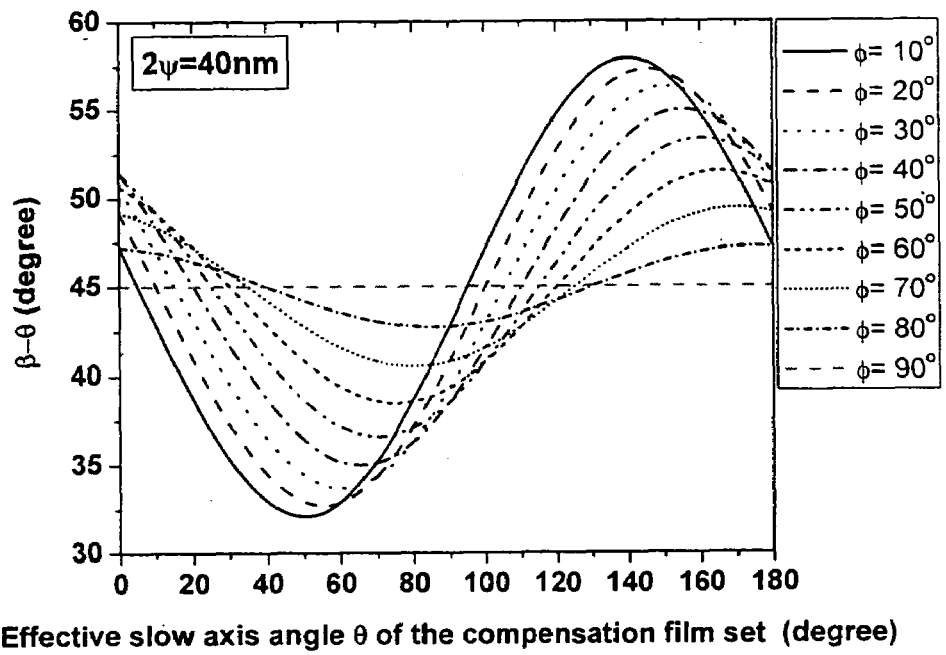
FIG. 5D shows the relationship between the effective relative polarizer angle β-θ and the effective slow axis angle θ of the compensation film set of the GF-RTN-LCD in this invention when 2ψ=40 nm and twist φ>0°.
Figure 5E:
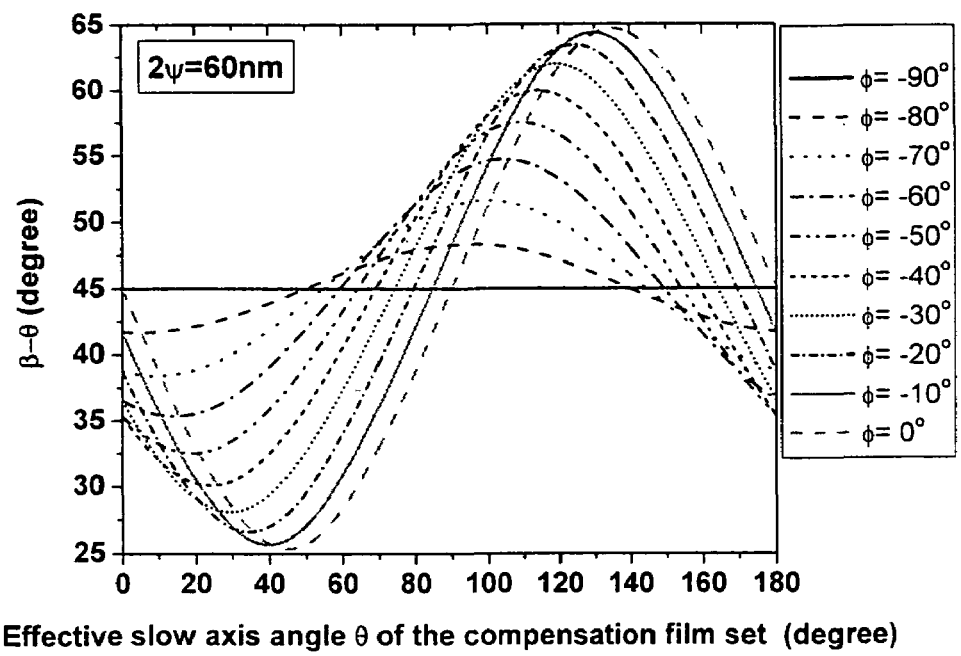
FIG. 5E shows the relationship between the effective relative polarizer angle β-θ and the effective slow axis angle θ of the compensation film set of the GF-RTN-LCD in this invention when 2ψ=60 nm and twist φ≦0°.
Figure 5F:
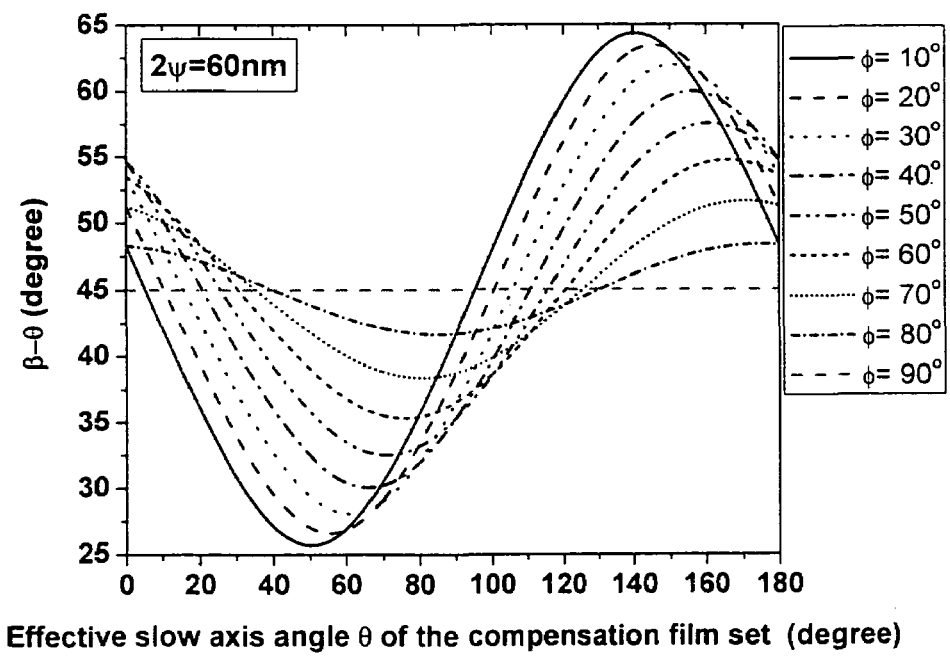
FIG. 5F shows the relationship between the effective relative polarizer angle β-θ and the effective slow axis angle θ of the compensation film set of the GF-RTN-LCD in this invention when 2ψ=60 nm and twist φ>0°.

FIGS. 5A-5F show the relationship between the effective relative polarizer angle β-θ and effective slow axis angle θ of the compensation film set for different twist angle φ when the total boundary residual retardation is 2ψ=approximately 20 nm in FIGS. 5A and 5B, 2ψ=approximately 40 nm in FIGS. 5C and 5D and 2ψ=approximately 60 nm in FIGS. 5E and 5F.

According to the graphs, the effective relative polarizer angle β-θ varies in the vicinity of approximately 45°. When φ=±approximately 90°, the effective relative polarizer angle β-θ equals approximately 45° and the incident light is converted to a circularly polarized light since the compensation film set is equivalent to a quarter-wave, as shown in FIGS. 4A through 4F. When φ=0θ, the oscillation reaches the maxima. Comparing FIGS. 5A through 5F, it is also apparent that the variation range increases when the total boundary residual retardation increases from approximately 20 nm to approximately 60 nm. For a given liquid crystal material, the total boundary residual retardation 2ψ decreases with an increase in the applied voltage. Generally, the larger the total residual retardation 2ψ, the larger the variation range of δ and β-θ.

Based on the conditions of the compensation film set 120 and the polarizer 110, the electro-optical (EO) performance is independent on the effective slow axis angle θ of the compensation film set 120. Therefore, for a given cell wherein the twist angle φ and total boundary residual retardation 2ψ are known, as long the effective phase of the compensation film set is selected according to Equation (1) and the effective relative polarizer angle is selected according to Equation (2) then the resulting EO curve is approximately identical regardless of the effective slow axis angle that is selected.

Figure 6:
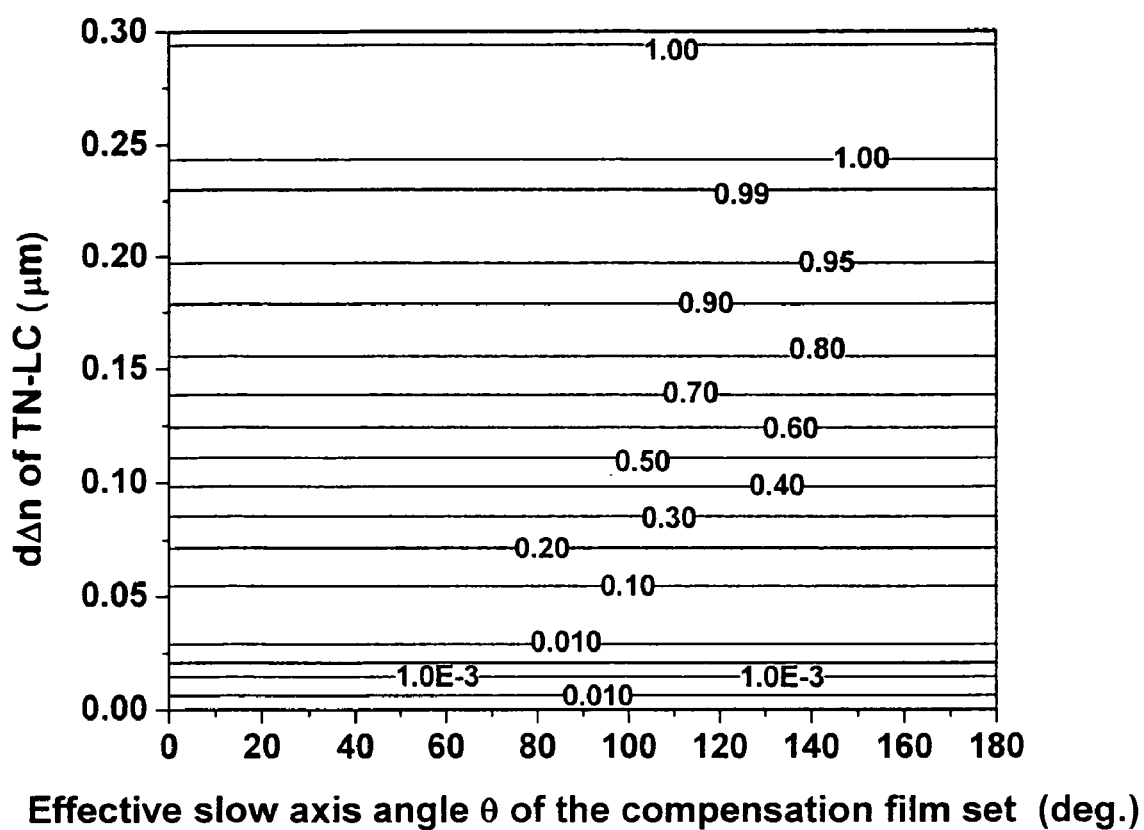
FIG. 6 is a graph of the electro-optic performance of GF-RTN-LCD which is independent of the effective slow axis angle θ of the compensation film set. The numbers in this figure represent normalized reflectance and the lines denote the iso-reflectance line, wherein 2ψ=40 nm and λ=550 nm is assumed.

For example, FIG. 6 graphs the iso-reflectance of an approximately 70° GF-RTN-LCD for different effective slow axis angle θ, using a total residual retardation of 2ψ=approximately 40 nm and a wavelength, λ=approximately 550 nm. According to the graph of FIG. 6, the iso-reflectance line is independent of the effective slow axis angle θ, therefore the EO curve is also independent of the angle θ.

Figure 7A:
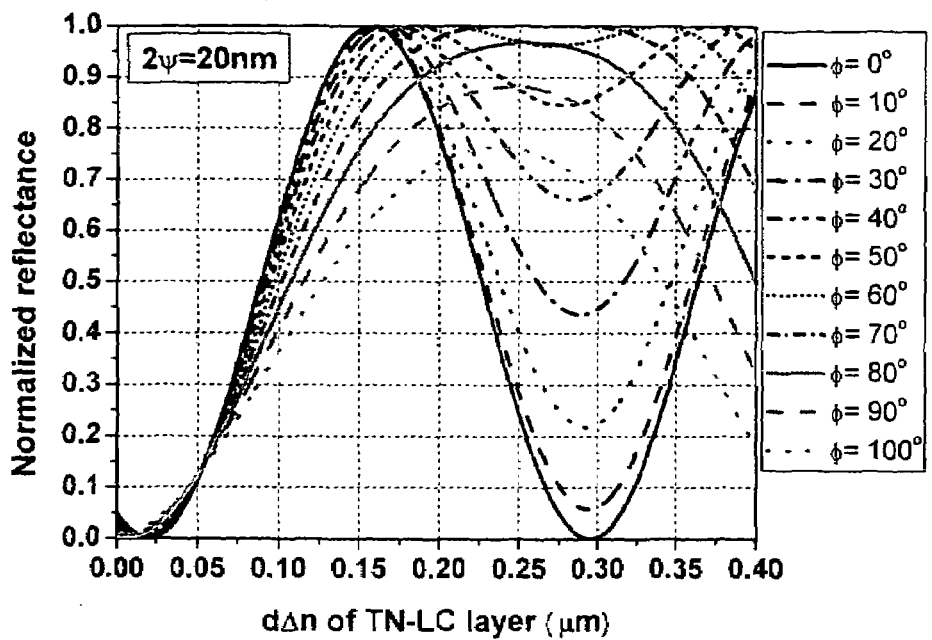
FIG. 7A is the graph of the dΔn dependent normalized reflectance of different twist angle GF-RTN-LCD in this invention when the effective phase retardation value δ and the effective relative polarizer angle β-θ are determined according to Equations (1) and (2) with total boundary residual retardation 2ψ=20 nm at the predesigned operating voltage.
Figure 7B:
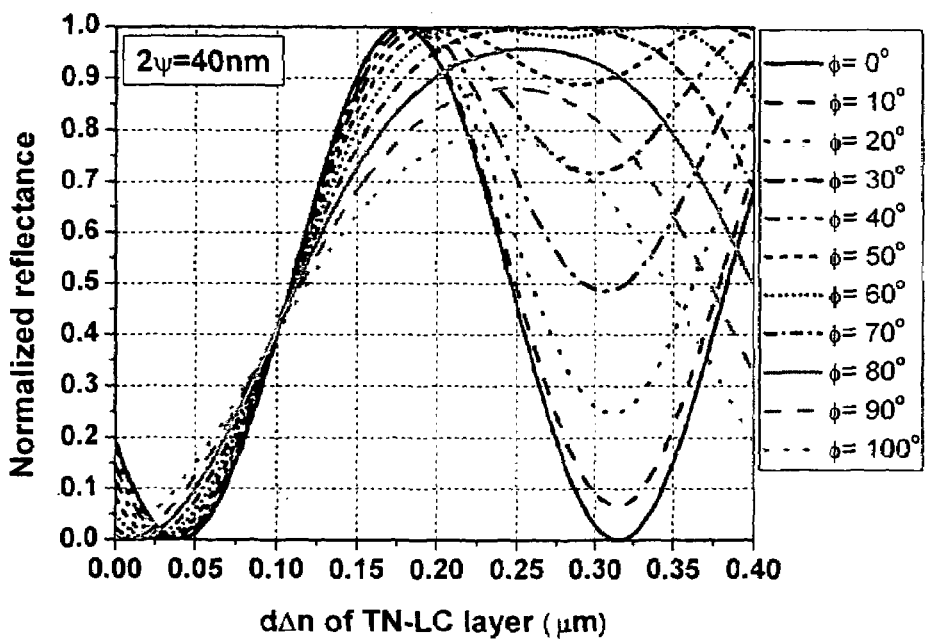
FIG. 7B is the graph of the dΔn dependent normalized reflectance of different twist angle GF-RTN-LCD in this invention when the effective phase retardation value δ and the effective relative polarizer angle β-θ are determined according to Equations (1) and (2) with total boundary residual retardation 2ψ=40 nm at the predesigned operating voltage.
Figure 7C:
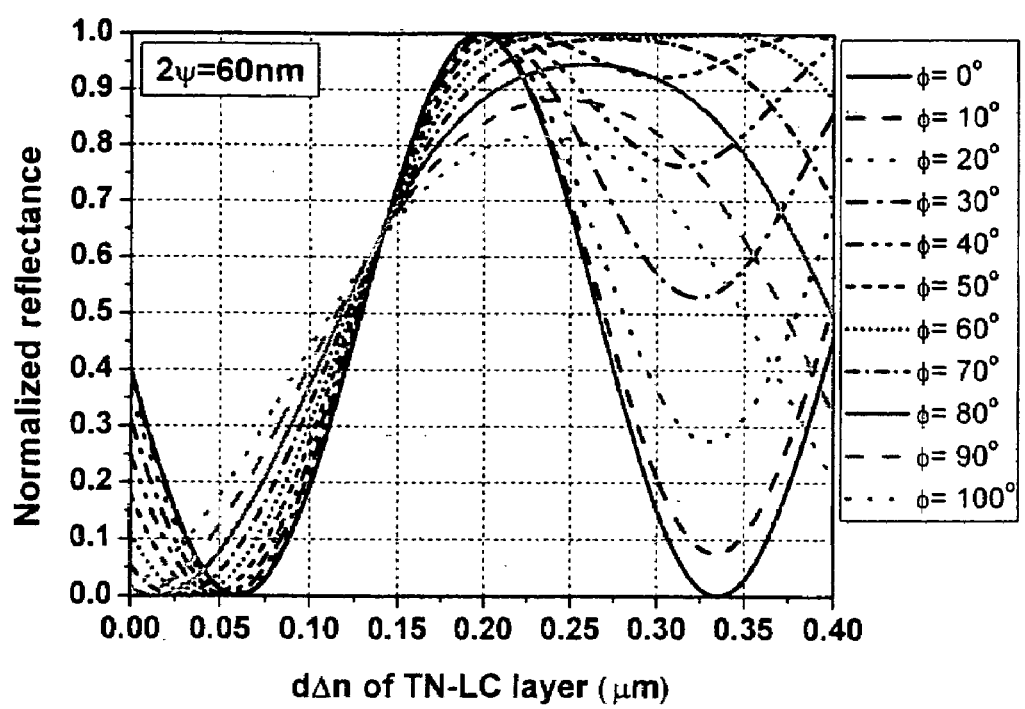
FIG. 7C is the graph of the dΔn dependent normalized reflectance of different twist angle GF-RTN-LCD in this invention when the effective phase retardation value δ and the effective relative polarizer angle β-θ are determined according to Equations (1) and (2) with total boundary residual retardation 2ψ=60 nm at the predesigned operating voltage.

After the parameters of the compensation film set and the polarizer are obtained, we need to find the thickness of TN-LC layer for each twist angle in order to get high reflectance for the voltage-off state. FIGS. 7A-7C graph the dΔn dependent normalized reflectance of the GF-RTN-LCD when the effective phase retardation value δ and the effective relative polarizer angle β-θ are determined according to Equations (1) and (2) for three cases of total boundary residual retardation: 2ψ=approximately 20 nm, approximately 40 nm and approximately 60 nm, respectively. From these graphs, it is obvious that the normalized reflectance is kept at unity within a wide range when φ is approximately approximately 60° to approximately 70°. Keeping the normalized reflectance approximately at unity within a wide range results in low color dispersion within the range.

Figure 8A:
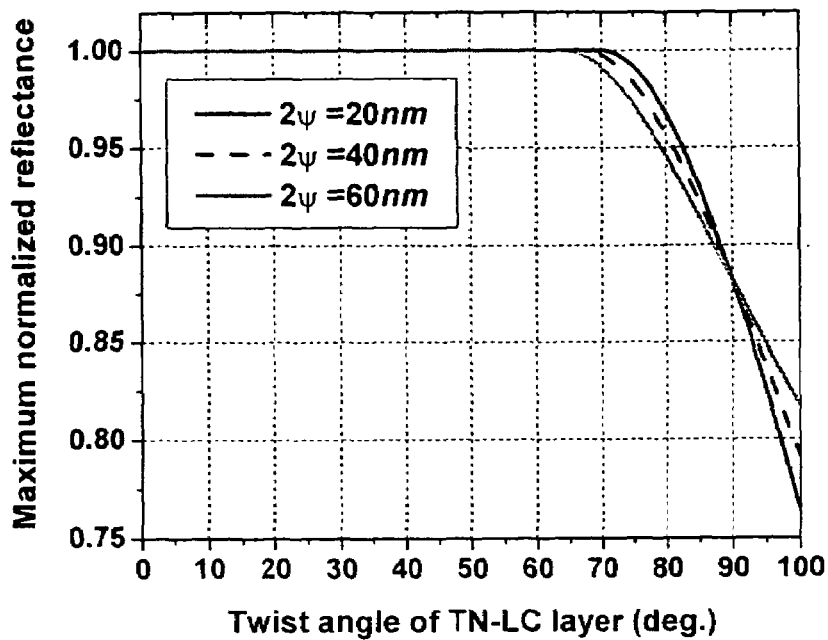
FIG. 8A shows the relationship between the maximum normalized reflectance and twist angle of GF-RTN-LCD in this invention when the effective phase retardation value δ and the effective relative polarizer angle β-θ are determined according to Equations (1) and (2) with total boundary residual retardation 2ψ=20 nm, 40 nm and 60 nm, respectively, wherein λ=550 nm is assumed.

In order to get intuitive concepts on the maximum normalized reflectance and its corresponding dΔn dependent normalized reflectance of the GF-RTN-LCD, FIG. 8A illustrates the relationship between the maximum normalized reflectance and twist angle of GF-RTN-LCD when the effective phase retardation value δ and the effective relative polarizer angle β-θ are determined according to Equations (1) and (2) with total boundary residual retardation 2ψ=20 nm, approximately 40 nm and approximately 60 nm, respectively, wherein λ=approximately 550 nm is assumed. When twist angle is larger than about 70°, the maximum normalized reflectance drops below approximately 100%. As the total boundary residual retardation 2ψ increases, the maximum twist angle that corresponds to approximately 100% normalized reflectance decreases accordingly.

Figure 8B:
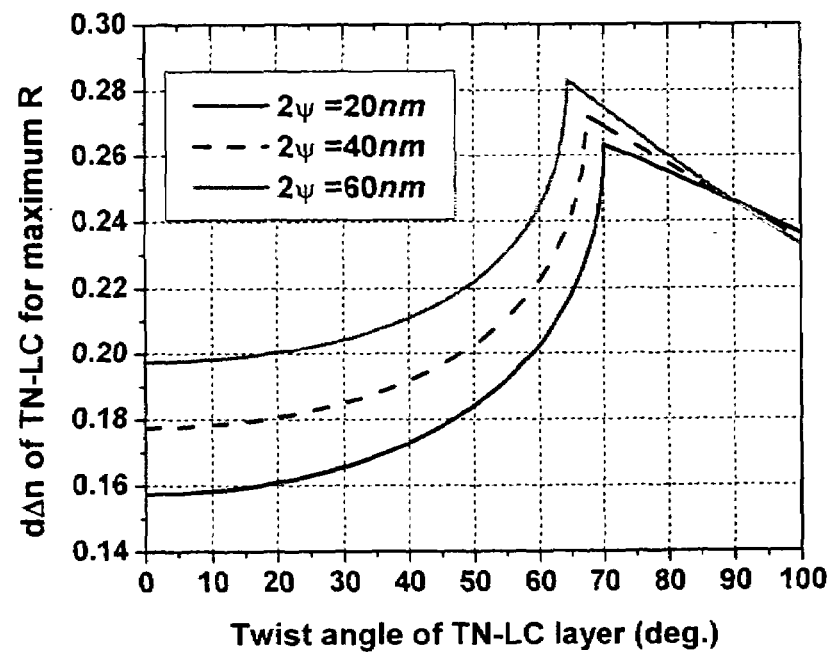
FIG. 8B shows the dependence of the dΔn value corresponding to the maximum normalized reflectance on the twist angle of GF-RTN-LCD in this invention when the effective phase retardation value δ and the effective relative polarizer angle β-θ are determined according to Equations (1) and (2) with total boundary residual retardation 2ψ=20 nm, 40 nm and 60 nm, respectively, wherein λ=550 nm is assumed.

FIG. 8B illustrates the dependence of the dΔn value corresponding to the maximum normalized reflectance on the twist angle of GF-RTN-LCD in this invention when the effective phase retardation value δ and the effective relative polarizer angle β-θ are determined according to Equations (1) and (2) with total boundary residual retardation 2ψ=approximately 20 nm, approximately 40 nm and approximately 60 nm, respectively, wherein λ=approximately 550 nm is assumed.

Based on the conditions of the compensation film set, the polarizer and dΔn dependent normalized reflectance value of the GF-RTN-LCD, alternative embodiments of the present invention are discussed. The simulation parameters used in the alternative embodiments are listed in Table 1.

TABLE 1

| Parameters | Value |
|---|---|
| $n_e$ (λ = 450,550,650 nm) | (1.559, 1.548, 1.542) |
| $n_o$ (λ = 450,550,650 nm) | (1.485, 1.476, 1.471) |
| Δn | (0.074, 0.072, 0.071) |
| $K_{11}$ | $9.6 \times 10^{-12}$ N |
| $K_{22}$ | $6.1 \times 10^{-12}$ N |
| $k_{33}$ | $14.2 \times 10^{-12}$ N |
| $\epsilon_{//}$ | 14.3 |
| $\epsilon_{\perp}$ | 4.0 |
| Pretilt angle | 3° |
| Free pitch | 300 μm |

An approximately 70° GF-RTN-LCD is selected for the first example. From FIGS. 7A-7C, the maximum reflectance occurs at dΔn≅approximately 0.26 μm, therefore, the cell gap is selected to be approximately 3.6 μm for the LC material employed. A driving voltage of approximately 4 $V_{rms}$ is selected for the desired dark state. The total residual retardation 2ψ at the selected driving voltage is 2ψ=approximately 37 nm from the simulation results.

Figure 9A:
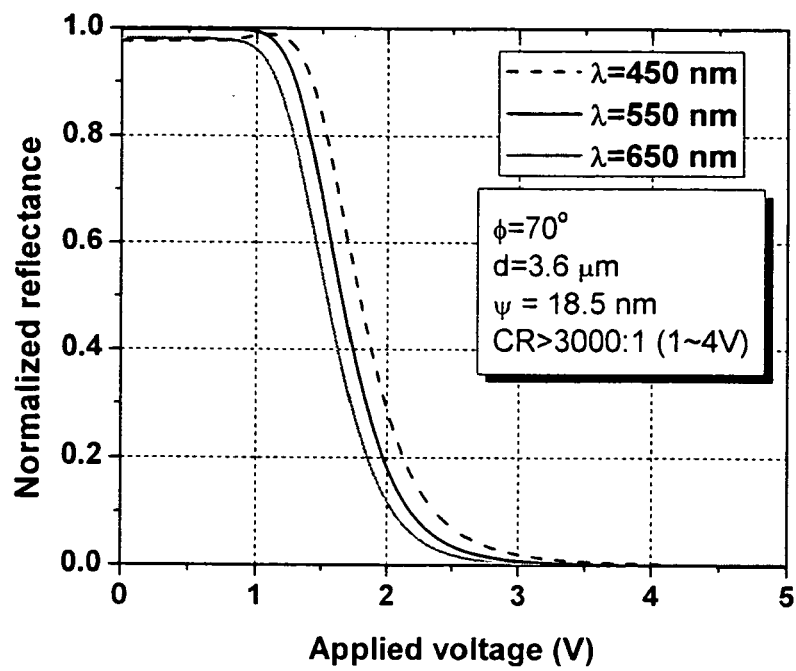
FIG. 9A is a graph of the voltage-dependent normalized reflectance of a 3.6-μm-thick 70° GF-RTN-LCD with the compensation film set and polarizer designs based on the residual phase retardation 2ψ=37 nm at 4 $V_{rms}$.

Then, based on this total residual retardation, we can get the effective phase of the compensation film set and the effective relative polarizer angle from Equations (1) and (2). Since the EO performance is independent of the effective slow axis angle θ, we can choose any θ angle in determining δ and β-θ as expressed in Equations (1) and (2). At last, based on the compensation film parameters and the polarizer conditions, the electro-optical EO performances are obtained as plotted in FIG. 9A. As previously discussed, the color dispersion at V=0 is very small.

Figure 9B:
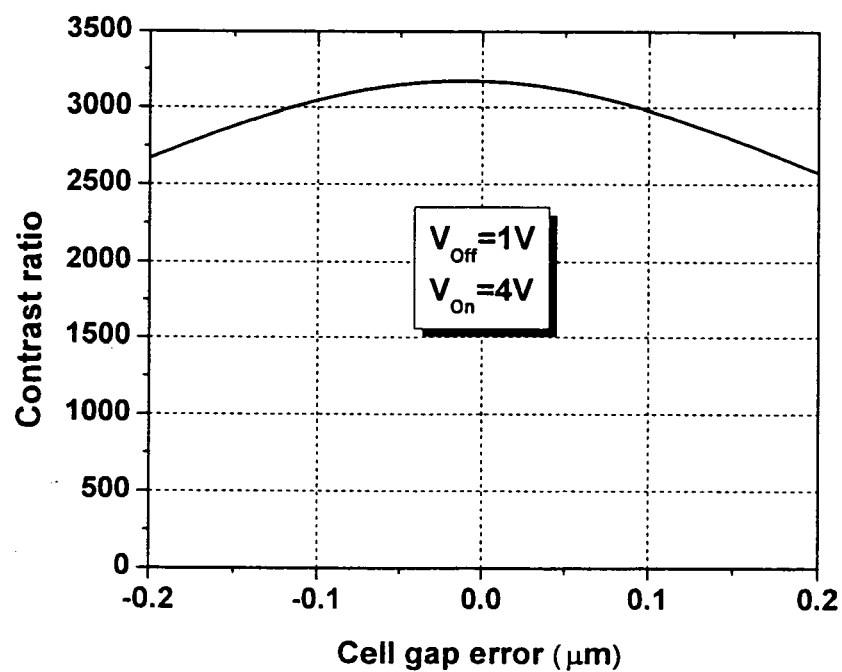
FIG. 9B is a graph of the cell gap tolerance on the device contrast ratio corresponding to the GF-RTN-LCD of FIG. 9A.
Figure 10A:
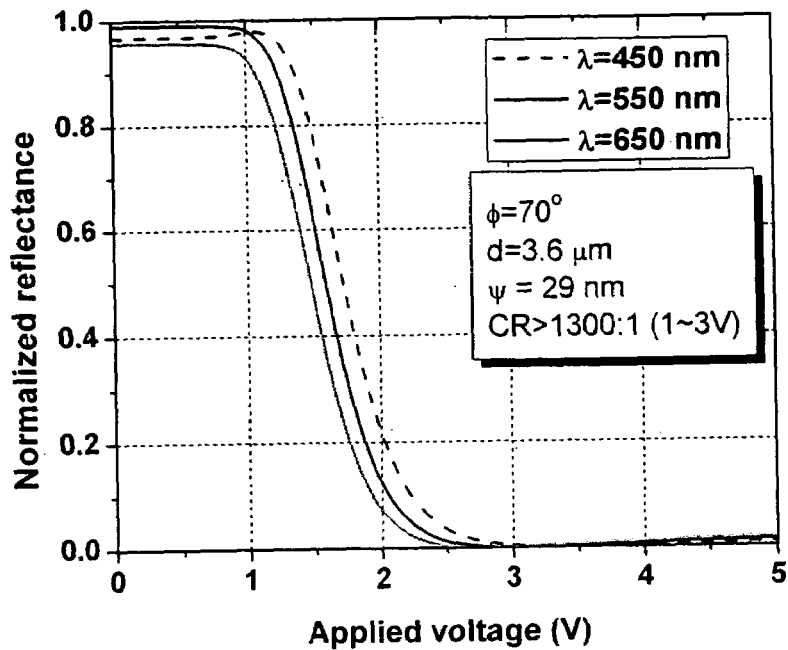
FIG. 10A is a graph of the voltage-dependent normalized reflectance of a 3.6-μm-thick 70° GF-RTN-LCD with the compensation film set and polarizer designs based on the total residual phase retardation 2ψ=58 nm at 3 $V_{rms}$.

FIG. 9B is a plot of the cell gap tolerance and from the graph it is shown that even if the cell gap has ±0.2 μm uncertainty, the contrast ratio is still greater than approximately 2500:1. If the driving voltage is decreased to approximately 3V to lower the power consumption, the total residual phase at this diving voltage is determined and the compensation film set parameters and polarizer conditions are recalculated. After calculation, we get 2ψ=approximately 58 nm, and the corresponding EO performances are plotted in the FIG. 10A.

Figure 10B:
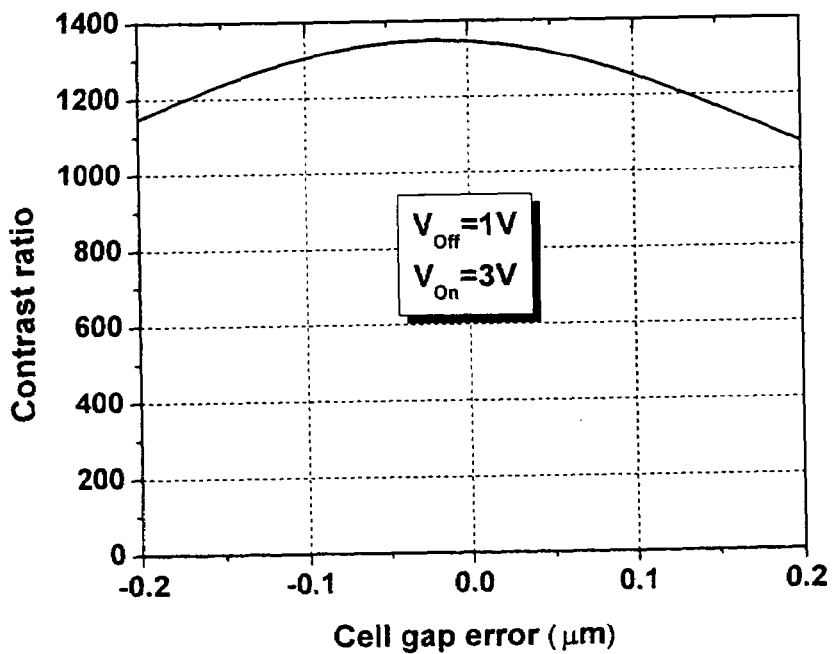
FIG. 10B is a graph of the cell gap tolerance on the device contrast ratio corresponding to the GF-RTN-LCD of FIG. 10A.

Since the driving voltage is decreased, the total residual retardation increases accordingly, resulting in a slight bounce in the EO curve after it reaches the dark state. The cell gap tolerance at approximately 4V driving voltage is plotted in the FIG. 10B, illustrating that the contrast ratio, even at the decreased driving voltage, is still greater than approximately approximately 1000:1. Again, a high contrast ratio of greater than approximately 1000:1 is achieved even if the cell gap error is ±approximately 0.2 μm.

Figure 11A:
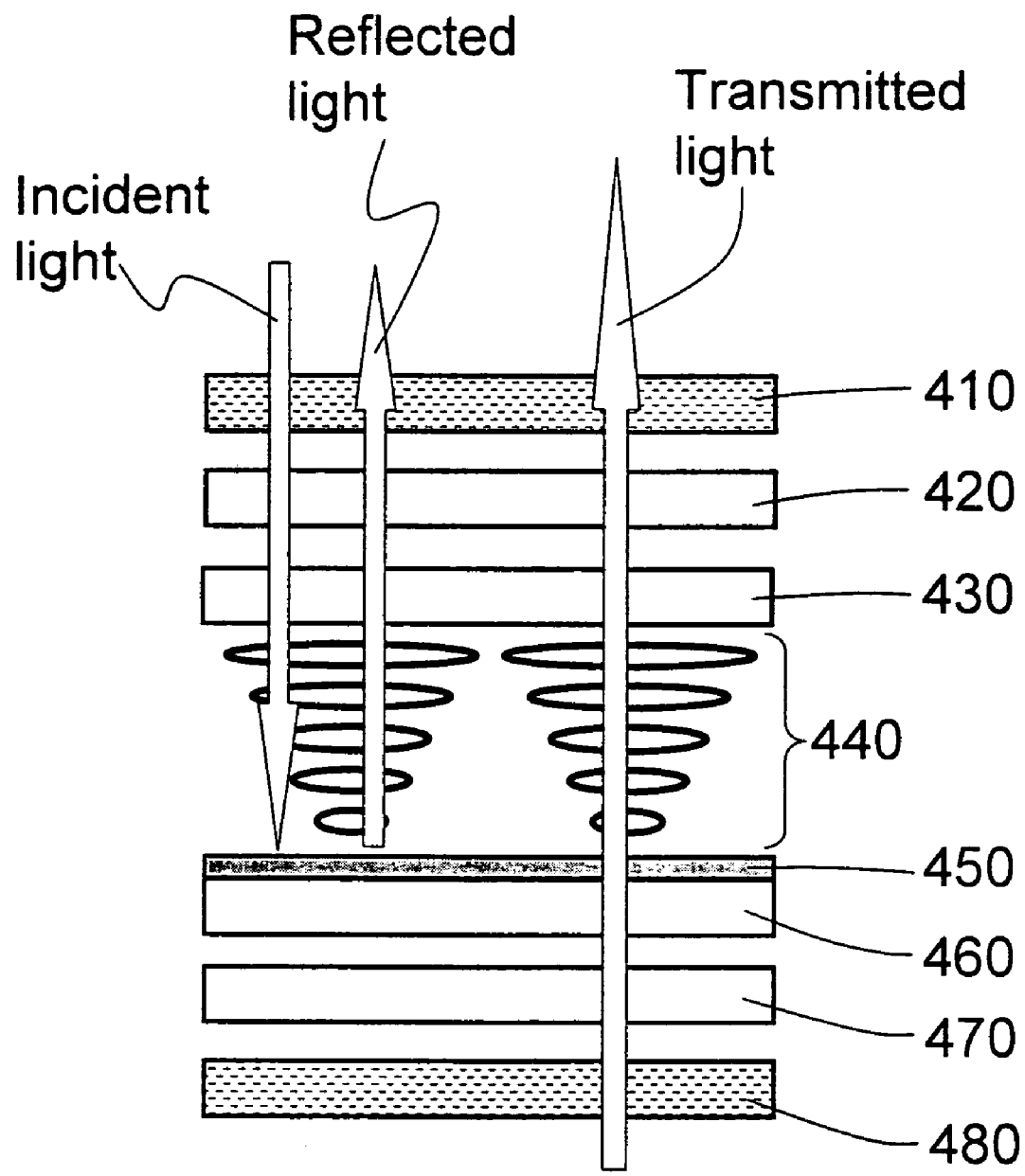
FIG. 11A shows the structure of a general film compensated transflective twisted nematic liquid crystal display (GF-TRTN-LCD) in this invention.

To extend this method, system, apparatus and device to a transflective LCD, a broadband quarter-wave film and another polarizer is added below the transflector. FIG. 11A shows the structure of a general film compensated transflective twisted nematic liquid crystal display (GF-TRTN-LCD) in this invention. It comprises a top substrate 430 with a compensation film set 420 and a first polarizer 410 laminated thereon, a bottom substrate 460 with a transflector means 450 laminated thereon, a twisted nematic liquid crystal layer 440 sandwiched between the top substrate 430 and the transflector means 450, a broadband quarter-wave film 470 and a second polarizer 480, wherein the compensation film set 420 consists of at least one uniaxial retardation film and transflector means 450 allows a part of incident light to be reflected back and a part of light from backlight source to be transmitted through.

Figure 11B:
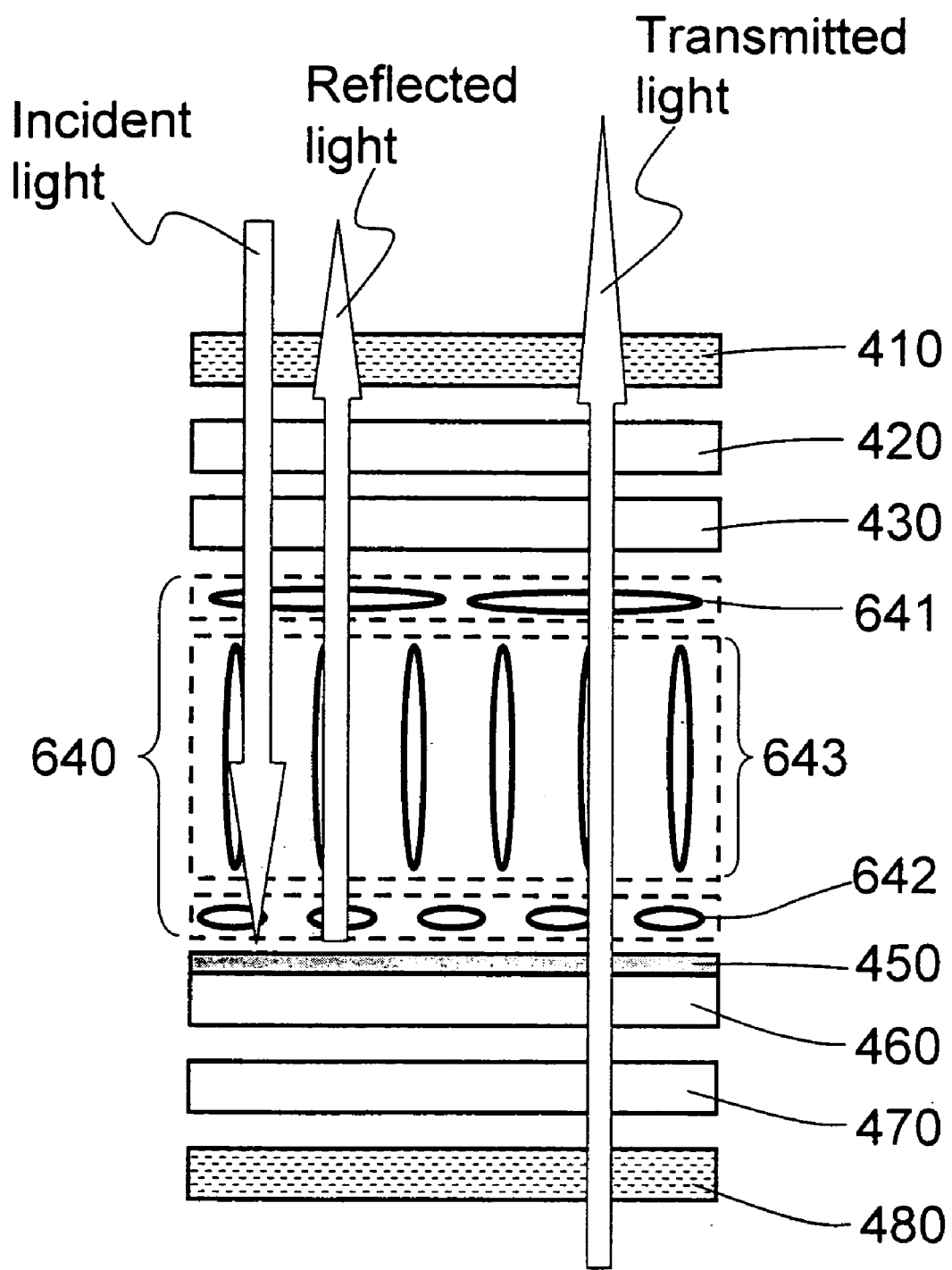
FIG. 11B shows the voltage-on state liquid crystal layer deformation in the GF-TRTN-LCD of FIG. 11A.
Figure 12:
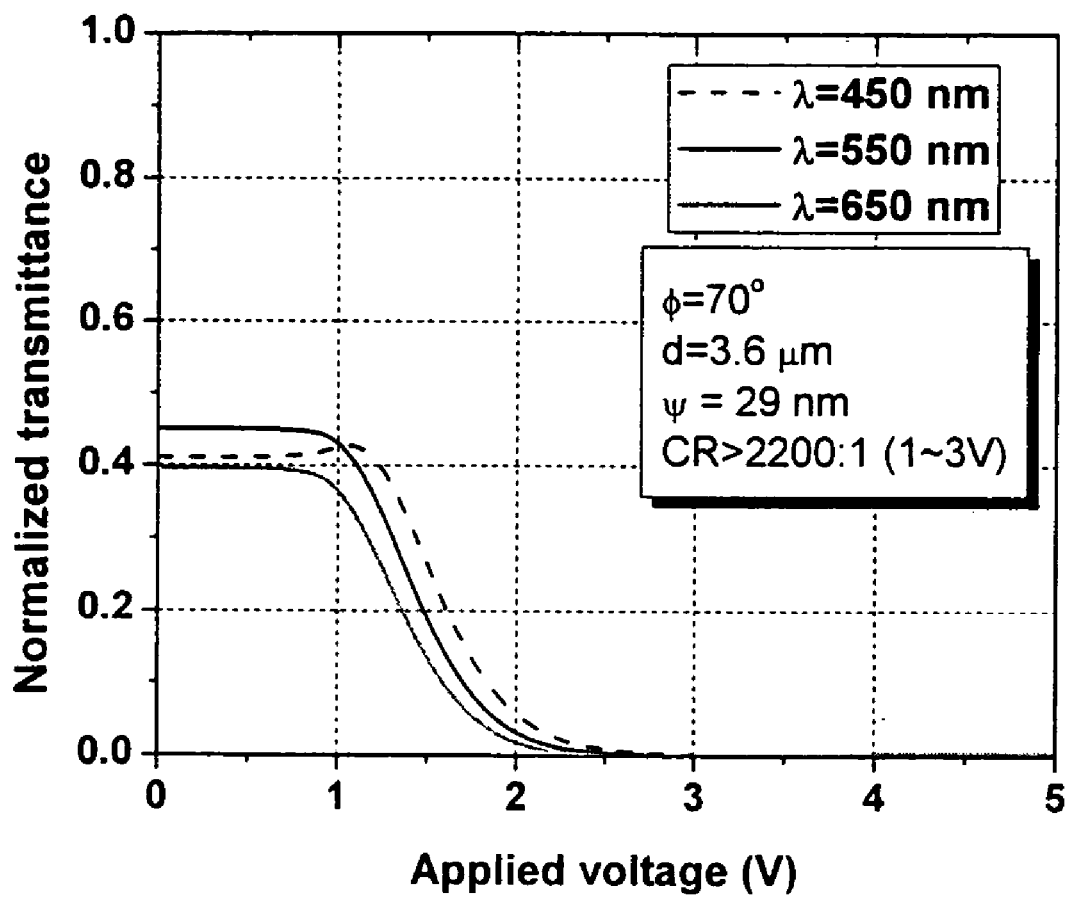
FIG. 12 is a graph of the voltage-dependent normalized transmittance of a 3.6-μm-thick 70° GF-TRTN-LCD with the compensation film set and polarizer designs based on the total residual phase retardation 2ψ=58 nm at 3 $V_{rms}$.

The arrows in FIG. 11A show the propagation directions of the incident light and the light from backlight source. FIG. 11B shows the voltage-on state liquid crystal layer deformation in the GF-TRTN-LCD of FIG. 11A. In the voltage-on state, the liquid crystal layer 640 also forms a 3 sublayer structure: one middle sublayer 643, one top boundary sublayer 641 and one bottom boundary sublayer 642. At voltage-on state, the combination of the compensation film set 420, the top boundary sublayer 641 and the bottom boundary sublayer 642 functions as a broadband quarter-wave film. Therefore, after the backlight passes through the second polarizer 480 and the broadband quarter-wave film 470, it becomes circularly polarized. When this circularly polarized backlight passes through the transflector 450, the liquid crystal layer 640 and the compensation film set 420, it becomes another linearly polarized light, which is perpendicular to the transmission axis of the first polarizer 410. Therefore, the backlight is totally blocked by first polarizer 410, resulting in a good dark state. FIG. 12 is a graph of the voltage dependent transmittance of transmissive-mode approximately 3.6-μm-thick approximately 70° GF-TRTN-LCD and the resulting contrast ratio exceeds approximately 2200:1.

Figure 13A:
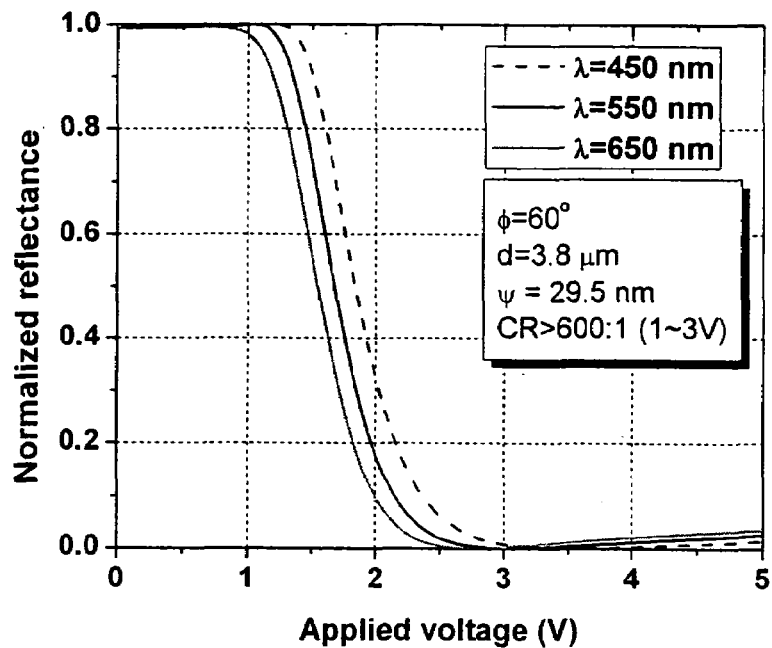
FIG. 13A is a graph of the voltage-dependent normalized reflectance of a 3.8-μm-thick 60° GF-TRTN-LCD with the compensation film set and polarizer designs based on the total residual phase retardation 2ψ=59 nm at 3 $V_{rms}$.
Figure 13B:
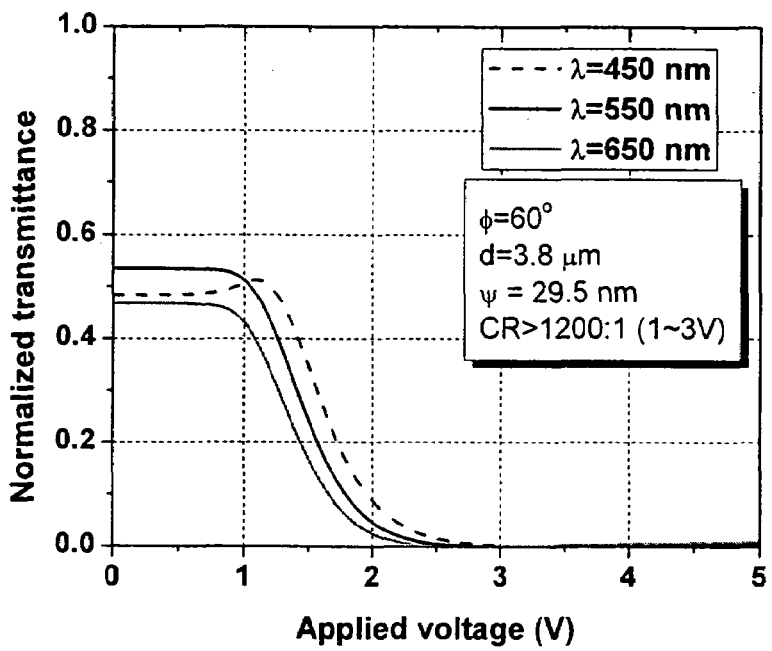
FIG. 13B is a graph of the voltage-dependent normalized transmittance of a 3.8-μm-thick 60° GF-TRTN-LCD with the compensation film set and polarizer designs based on the total residual phase retardation 2ψ=59 nm at 3 $V_{rms}$.
Figure 13C:
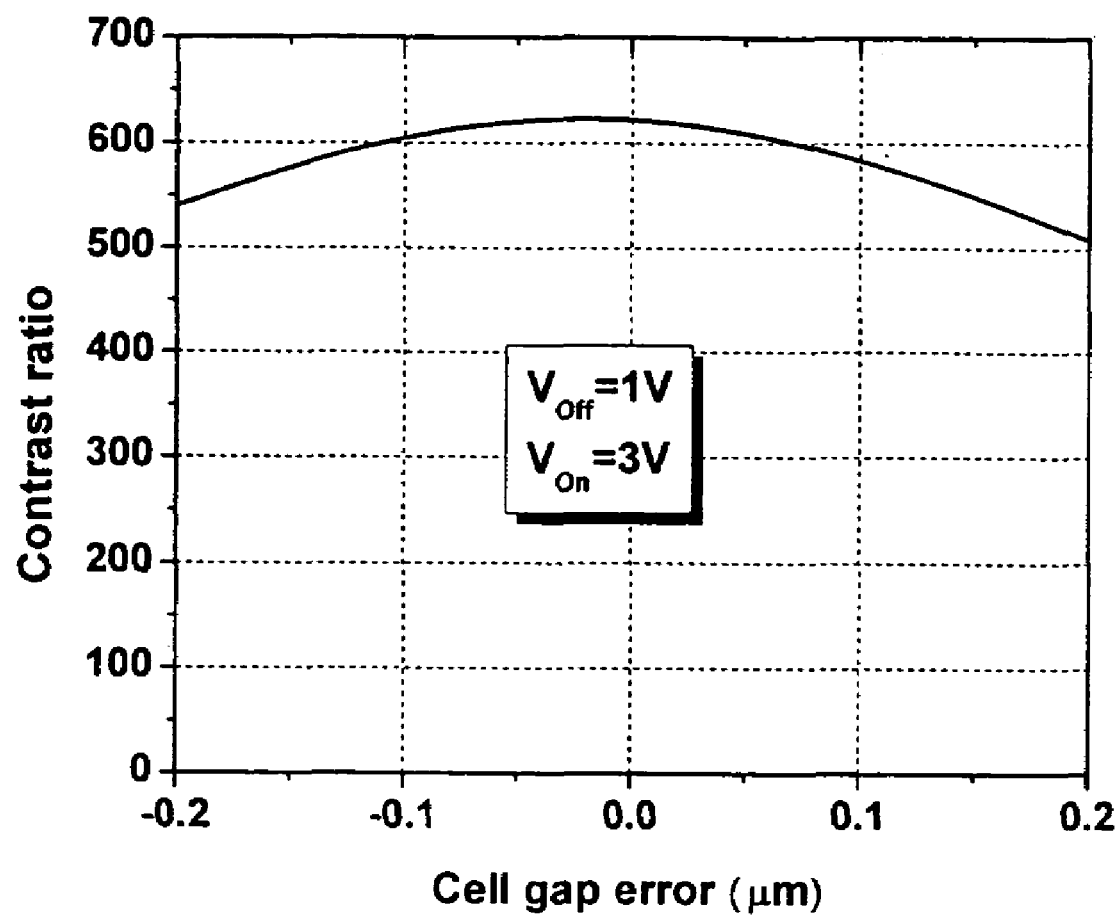
FIG. 13C is a graph of the cell gap tolerance on the device reflective mode contrast ratio corresponding to the GF-TRTN-LCD of FIG. 13A.

FIGS. 13A through 13C are graphs according to another embodiment of the invention using approximately 3.8-μm-thick approximately 60° GF-TRTN-LCD. When the driving voltage is 3V, the total boundary residual retardation is 2ψ=approximately 59 nm. In this embodiment, the contrast ratio exceeds 600:1 for the reflective mode and approximately 1200:1 for transmissive mode. The cell gap tolerance is good and even if the cell gap has ±approximately 0.2 μm variation, the reflective mode still has a contrast ratio greater than approximately 500:1.

Figure 14A:
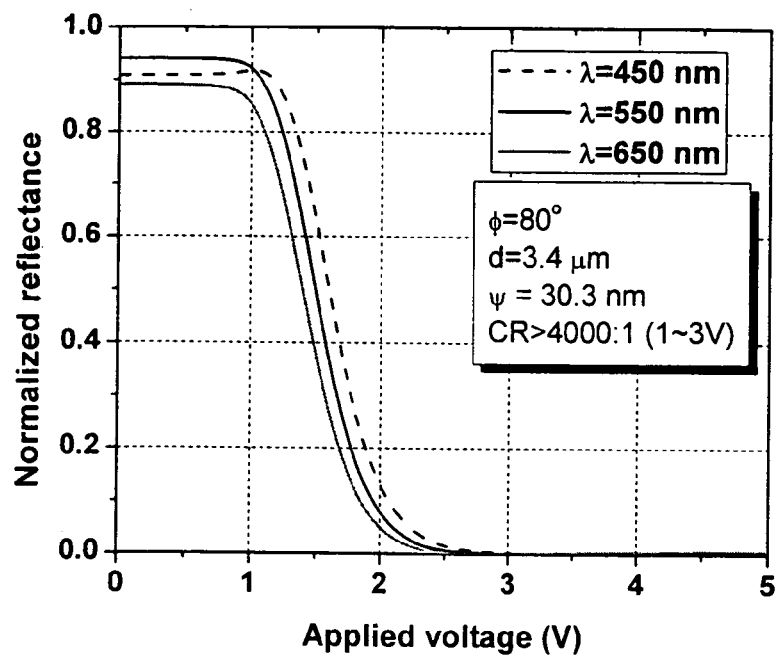
FIG. 14A is a graph of the voltage-dependent normalized reflectance of the 3.4-μm-thick 80° GF-TRTN-LCD with the compensation film set and polarizer designs based on the total residual phase retardation 2ψ=61 nm at 3 $V_{rms}$.
Figure 14B:
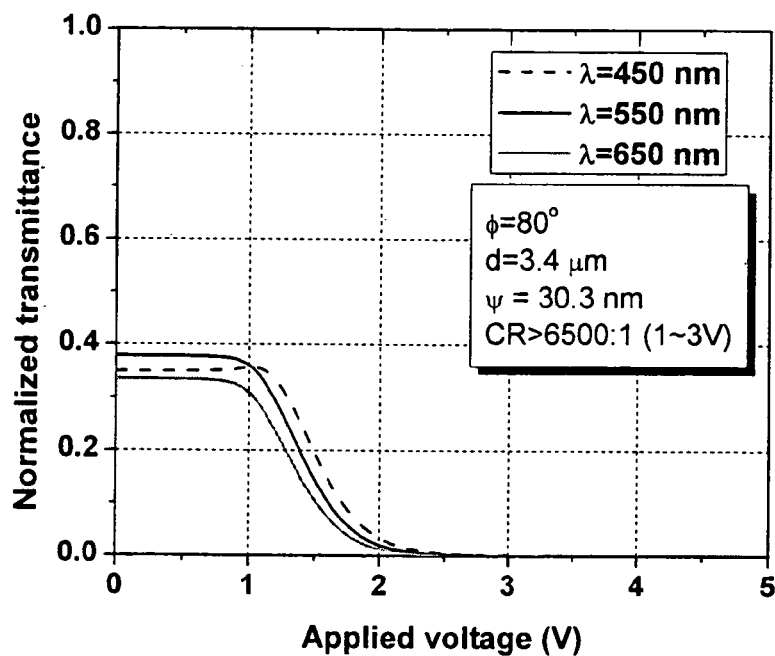
FIG. 14B is a graph of the voltage-dependent normalized transmittance of the 3.4-μm-thick 80° GF-TRTN-LCD with the compensation film set and polarizer designs based on the total residual phase retardation 2ψ=61 nm at 3 $V_{rms}$.
Figure 14C:
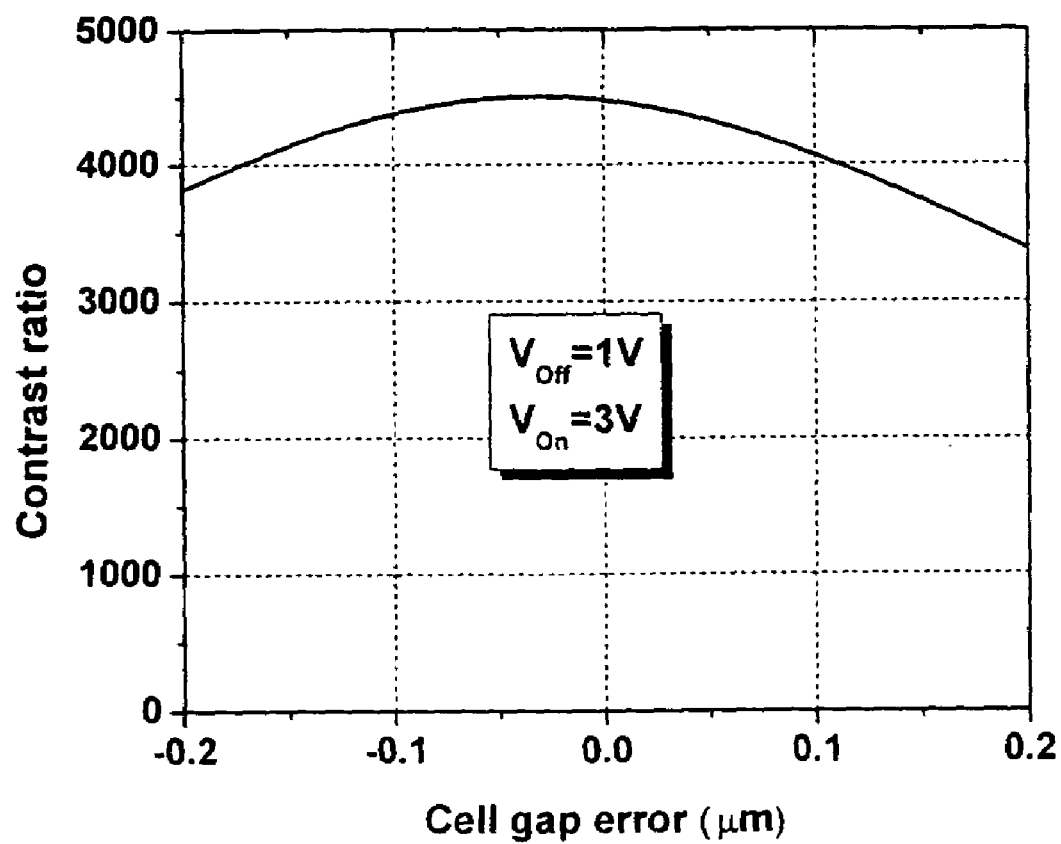
FIG. 14C is a graph of the cell gap tolerance on the device reflective mode contrast ratio corresponding to the GF-TRTN-LCD of FIG. 14A.
Figure 15A:
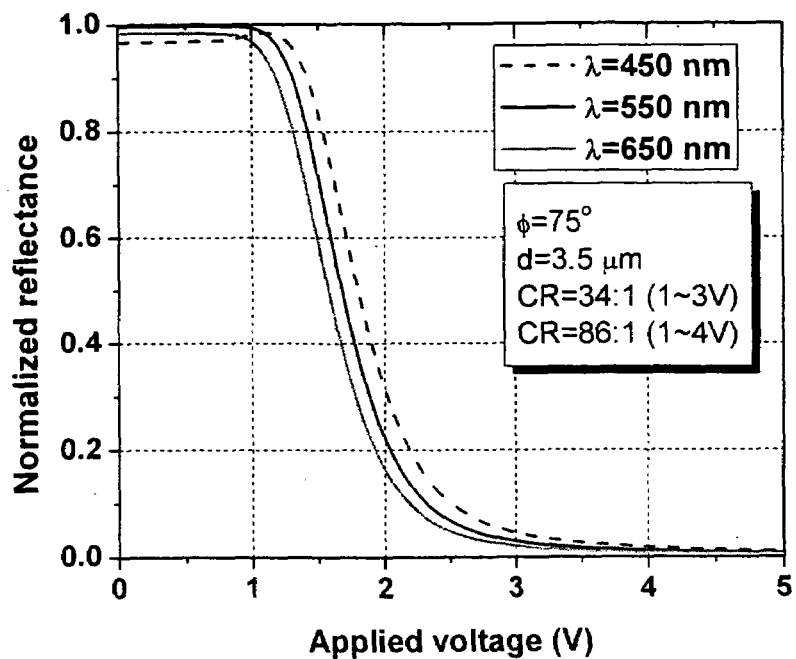
FIG. 15A is a graph of the voltage-dependent normalized reflectance of a prior art of transflective LCD using a broadband circular polarizer with φ=75° and a cell gap d=3.5 μm.
Figure 15B:
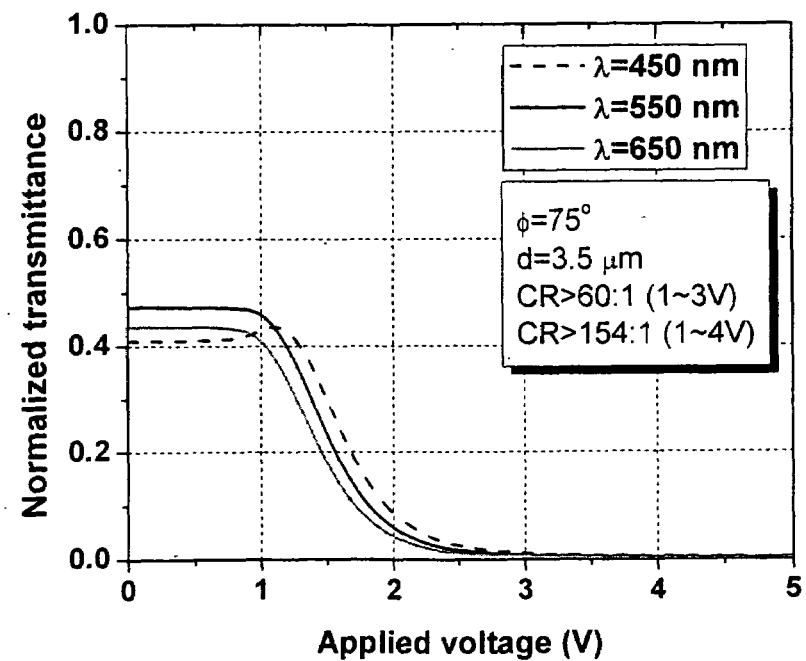
FIG. 15B is a graph of the voltage-dependent normalized transmittance of a prior art of transflective LCD using a broadband circular polarizer with φ=75° and a cell gap d=3.5 μm.

FIGS. 14A-14C are graphs according to a third embodiment of the invention using a 3.4-μm-thick 80° GF-TRTN-LCD. Selecting the same approximately 3V driving voltage, the total boundary residual retardation is 2ψ=approximately 60.6 nm. In this embodiment, the reflective mode contrast ratio is greater than approximately 4000:1 and the transmissive mode contrast ratio is greater than approximately 6500:1. The cell gap tolerance is good and even if the cell gap has ±approximately 0.2 μm error, the reflective mode contrast ratio remains greater than approximately 3000:1.

According to the method, system, apparatus and device of the present invention, the twist angle can be selected from a range of approximately 0° to approximately 100° as long as the compensation film set and the polarizer conditions are selected according to Equations (1) and (2). Additionally, the twist angle can be positive or negative, which means the twist sense of twisted nematic liquid crystal layer can be left-handedness and right-handedness. Since Equations (1) and (2) are deduced from a simplified two-sublayer model, the optimal compensation film set and polarizer conditions deviates slightly from these the results obtained from these two equations.

Typically, the actual value of the effective phase retardation $\delta_{actual}$ of the compensation film set is in the range of $(\delta-0.2\pi) \leq \delta_{actual} \leq (\delta+0.2\pi)$ and the actual value of the effective polarizer angle $\beta_{actual}$ is in the range of $(\beta-20°+n\cdot 90°) \leq \beta_{actual} \leq (\beta+20°+n\cdot 90°)$, where n is an integer and δ is determined according to Equation (1) and β is determined according to Equation (2). The key concept of this invention is to use a compensation film set to compensate the boundary residual retardation and to obtain a high contrast ratio reflective or transflective LCD.

To compare the results achieved using the present invention with prior arts, FIGS. 14A and 14B depict the electro-optic performances of approximately 3.5-μm-thick approximately 75° MTN cell of the prior art. In the voltage-off state, the reflectance reaches unity. However, the light leakage in the dark state is relatively high due to the incomplete surface compensation. The calculated reflective mode contrast ratio is only approximately 86:1 even when the driving voltage is increased to approximately 4V. If the operating voltage is reduced to approximately 3V, then the corresponding contrast ratio decreases to approximately 30:1 which is inadequate for most display applications.

In summary, the present invention provides a new compensation method, system, apparatus and device to achieve a high contrast ratio, high brightness and low color dispersion reflective and transflective liquid crystal display. Based on the total boundary residual retardation, the corresponding compensation film set and polarizer conditions are determined. Using the determined compensation film set and polarizer conditions, a general film compensated reflective twisted-nematic liquid crystal display with high contrast ratio, high reflectance and low color dispersion is produced.

While the above summary relates to application of the method, system, apparatus and device of the present invention to a reflected TN-LCD, the method, system, apparatus and device may also be applied to a transflective LCD.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A reflective liquid crystal display comprising:
a top substrate having a compensation film set and a linear polarizer laminated thereon on the outer surface;
a bottom substrate having a reflector laminated thereon on the inner surface;
a first aligment film with a first rubbing direction coated on the inner surface of the top substrate,
a second alignment film with a second rubbing direction coated on the reflector means, and
a twisted nematic liquid crystal layer sandwiched between the top substrate and the reflector means, wherein the twisted nematic liquid crystal layer contacts with both the first alignment layer and the second alignment layer, wherein the twisted nematic liquid crystal layer has a twist angle φ at voltage-off state and has a residual phase retardation α on each boundary at the voltage-on state; and wherein the compensation film set has an effective phase retardation value δ in the range $(\delta_0-0.2\pi) \leq \delta \leq (\delta_0+0.2\pi)$ with δ0 satisfies the equation $$\delta_0 = \operatorname{atan}\left(\frac{\sin^2\phi + \cos 2\alpha\cos^2\phi}{\sin\alpha\sin 2\theta\sin 2\phi + \sin 2\alpha\cos 2\theta\cos^2\phi}\right)$$

where the effective slow axis angle θ of the compensation film set is in the range of $0° \leq \theta \leq 180°$ and an effective slow axis direction θ in reference to the first rubbing direction of the top substrate, and the compensation film set herein is used to compensate the boundary residual phase retardation of the twisted nematic liquid crystal layer at voltage-on state to improve a contract ratio of the reflective liquid crystal display.

2. The reflective liquid crystal display of claim 1, wherein the compensation film set comprises plural uniaxial retardation films with their slow axes parallel to their film surfaces thereof, wherein the plural uniaxial retardation films are approximately equivalent to an effective compensation film with its effective slow axis parallel to the effective compensation film surface thereof.

3. The reflective liquid crystal display of claim 1 wherein the linear polarizer forms an angle β in reference to the first rubbing direction of the top substrate and β angle is in the range of $(\beta_0-20°+n\cdot 90°) \leq \beta \leq (\beta_0+20°+n\cdot 90°)$, where n is an integer, with $\beta_0$ satisfies the equation (b):

$$\beta_0 = \theta + \frac{1}{2}\operatorname{atan}\left(-\frac{\sin^2\phi + \cos 2\alpha\cos^2\phi}{\sin\delta_0(\sin\alpha\cos 2\theta\sin 2\phi - \sin 2\alpha\sin 2\theta\cos^2\phi)}\right), \quad (b)$$

where the effective slow axis angle θ of the compensation film set is in the range of $0°\leq\theta\leq 180°$ and $\delta_0$ is obtained from Equation (a).

4. The reflective liquid crystal display of claim 1, wherein the twisted nematic liquid crystal layer includes a twist angle ranging from approximately negative 90 degrees to approximately positive 90 degrees, wherein the negative twist angle is a right-handedness twist sense and the positive twist angle is a left handedness twist sense.

5. The reflective liquid crystal display of claim 1, wherein the twisted nematic liquid crystal layer has a retardation value dΔn/λ ranging from approximately 0.25 to approximately 0.60, where d is a thickness of the twisted nematic liquid crystal layer, Δn is a birefringence of the twisted nematic liquid crystal layer material and λ is a central wavelength of an incident light.

6. A transflective liquid crystal display comprising:
a top substrate having a compensation film set and a first linear polarizer laminated thereon on the outer surface;
a bottom substrate having a transflector means laminated thereon on the inner surface and a broadband quarter-wave film and a second linear polarizer laminated thereon on the outer surface;
a first alignment film with a first rubbing direction coated on the inner surface of the top substrate,
a second alignment film with a second rubbing direction coated on the transflector means, and
a twisted nematic liquid crystal layer sandwiched between the top substrate and the transflector means, wherein the transflector means allows a part of incident ambient light to be reflected back to the observer and allows a part of the light from the backlight source to pass through to the observer, wherein the twisted nematic liquid crystal layer contacts with both the first aiigment layer and the seeond alignment layer, wherein the twisted nematic liquid crystal layer has a twist angle φ at voltage-off state and has a residual phase retardation α on each boundary at the voltage-on state; and wherein the compensation film set has an effective phase retardation value δ in the range of $(\delta_0 - 0.2\pi) \leq \delta \leq (\delta_0 + 0.2\pi)$ with $\delta_0$ satisfies the equation (c):

$$\delta_0 = a\tan\left(\frac{\sin^2\phi + \cos2\alpha\cos^2\phi}{\sin\alpha\sin2\theta\sin2\phi + \sin2\alpha\cos2\theta\cos^2\phi}\right), \quad (c)$$

where the errective slow axis angle θ of the compensation film set is in the range at $0° \leq \theta \leq 180°$,
and an effective slow axis direction θ in reference to the first rubbing direction of the top substrate, and the compensation film set herein is used to compensate the boundary residual phase retardation of the twisted nematic liquid crystal layer at voltage-on state to improve a contract ratio of the reflective liquid crystal display.

7. The transflective liquid crystal display of claim 6, wherein the compensation film set camprises plural uniaxial retardation films with their slow axes parallel to their film surfaces thereof, wherein the plural uniaxial retardation films are approximately equivalent to an effective compensation film with its effective slow axis parallel to the effective compensation film surface thereof.

8. The transflective liquid crystal display of claim 6, wherein the linear polarizer forms an angle β in referenee to the first rubbing direction of the top substrate and β angle is in the range of $(\beta_0 - 20° + n \cdot 90°) \leq \beta \leq (\beta_0 + 20° + n \cdot 90°)$, where n is an integer, with $\beta_0$ satisfies the equation (d):

$$\beta_0 = \theta + \frac{1}{2}a\tan\left(-\frac{\sin^2\phi + \cos2\alpha\cos^2\phi}{\sin\delta_0(\sin\alpha\cos2\theta\sin2\phi - \sin2\alpha\sin2\theta\cos^2\phi)}\right), \quad (d)$$

where the effective slow axis angle θ of the compensation film set is in the range of $0° \leq \theta \leq 180°$ and $\delta_0$ is obtained from Equation (c):

$$\delta_0 = a\tan\left(\frac{\sin^2\phi + \cos2\alpha\cos^2\phi}{\sin\alpha\sin2\theta\sin2\phi + \sin2\alpha\cos2\theta\cos^2\phi}\right), \quad (c)$$

where the effective slow axis angle θ of the compensation film set is in the range of $0° \leq \theta \leq 180°$.

9. The transflective liquid crystal display of claim 6, wherein the twisted nematic liquid crystal layer includes a twist angle ranging from approximately negative 90 degrees to positive 90 degrees, wherein the negative twist angle is a right-handedness twist sense and the positive twist angle is a left handedness twist sense.

10. The transflective liquid crystal display of claim 6, wherein the twisted nematic liquid crystal layer has a retardation value dΔn/λ ranging from 0.25 to 0.60, where d is a thickness of the twisted nematic liquid crystal layer, Δn is a birefringence of the twisted nematic liquid crystal layer material and λ is a central wavelength of an incident light.

11. The transflective liquid crystal display of claim 6, wherein the twisted nematic liquid crystal layer has a retardation value dΔn/λ ranging from 0.25 to 0.60, where d is a thickness of the twisted nematic liquid crystal layer, Δn is a birefringence of the twisted nematic liquid crystal layer material and λ is a central wavelength of an incident light.

12. A reflective twisted nematic liquid crystal display with a liquid crystal layer comprising:
a top substrate having a compensation film set and a linear polarizer laminated on the outer surface;
a bottom substrate having a reflector laminated on the inner surface, the twisted nematic liquid crystal layer sandwiched between the top substrate and the reflector, wherein the twisted nematic liquid crystal layer forms a top boundary sublayer adjacent to the top substrate and a bottom boundary sublayer adjacent to the reflector laminated on the bottom substrate in a voltage-on state,
the phase compensation film for compensating residual phase retardation of the liquid crystal layer top and bottom boundary sublayers in the voltage-on state to increase the contrast ratio at a lower operating voltage and decrease color dispersion when used in reflective liquid crystal display modes, wherein the compensation film is selected based on twist angle and residual retardation of the liquid crystal layer, wherein the compensation film set has effective film phase retardation δ value and effective polarizer angle to caneel the tolal residual phase to obtain an excellent dark state for achieving the high contrast ratio.

13. The reflective liquid crystal display of claim 12, wherein the compensation film set comprises plural uniaxial retardation films with their slow axes parallel to their film surfaces thereof, wherein the plural uniaxial retardation films are approximately equivalent to an effective compensation film with its effective slow axis parallel to the effective compensation film surface thereof.

14. The reflective liquid crystal display of claim 12, wherein the effective phase retardation δ of the compensation film set is in the range of $(\delta_0-0.2\pi) \leq \delta \leq (\delta_0+0.2\pi)$ with $\delta_0$ satisfies the equation (a):

$$\delta_0 = a\tan\left(\frac{\sin^2\phi + \cos2\alpha\cos^2\phi}{\sin\alpha\sin2\theta\sin2\phi + \sin2\alpha\cos2\theta\cos^2\phi}\right), \quad (a)$$

where the effective slow axis angle θ of the compensation film set is in the range of $0° \leq \theta \leq 180°$.

15. The reflective liquid crystal display of claim 14, wherein the linear polarizer forms an angle β in reference to the first rubbing direction of the top substrate and β angle is in the range of $(\beta_0 - 20° + n \cdot 90°) \leq \beta \leq (\beta_0 + 20° + n \cdot 90°)$, where n is an integer, with $\beta_0$ satisfies the equation (b):

$$\beta_0 = \theta + \frac{1}{2}a\tan\left(-\frac{\sin^2\phi + \cos2\alpha\cos^2\phi}{\sin\delta_0(\sin\alpha\cos2\theta\sin2\phi - \sin2\alpha\sin2\theta\cos^2\phi)}\right), \quad (b)$$

where the effective slow axis angle θ of the compensation film set is in the range of $0° \leq \theta \leq 180°$ and $\delta_0$ is obtained from Equation (a).

16. The reflective liquid crystal display of claim 12, wherein the twisted nematic liquid crystal layer includes a twist angle ranging from approximately negative 90 degrees to approximately positive 90 degrees, wherein the negative twist angle is a right-handedness twist sense and the positive twist angle is a left handedness twist sense.

17. The reflective liquid crystal display of claim 12, wherein the twisted nematic liquid crystal layer has a retardation value $d\Delta n/\lambda$ ranging from approximately 0.25 to approximately 0.60, where d is a thickness of the twisted nematic liquid crystal layer, $\Delta n$ is a birefringence of the twisted nematic liquid crystal layer material and λ is a central wavelength of an incident light.

18. A transflective liquid crystal display comprising:
a top substrate having a compensation film set and a first linear polarizer laminated thereon on the outer surface;
a bottom substrate having a transflector means laminated thereon on the inner surface and a broadband quaterwave film and a second linear polarizer laminated thereon on the outer surface; and
a twisted nematic liquid crystal layer sandwiched between the top substrate and the transflector means, wherein in the voltage-on state, the liquid crystal layer forms a three sublayer structure: one middle sublayer, one top boundary sublayer and one bottom boundary sublayer and the combination of the compensation film set, the top boundary sublayer and the bottom boundary sublayer functions as a broadband quarter-wave film, therefore the transflector means allows a part of incident ambient light to be reflected back to the observer and allows a part of the light from the backlight source to pass through to the observer, wherein the twisted nematic liquid crystal layer has a twist angle φ at voltage-off state and has a residual phase retardation α on each boundary at the voltage-on state; and wherein the compensation film set has an effective phase retardation value δ and an effective slow axis direction θ in reference to the first rubbing direction of the top substrate, and the compensation film set herein is used to compensate the boundary residual phase retardation of the twisted nematic liquid crystal layer at voltage-on state to improve a contract ratio of the reflective liquid crystal display.

19. The transflective liquid crystal display of claim 18, wherein the compensation film set comprises plural uniaxial retardation films with their slow axes parallel to their film surfaces thereof, wherein the plural uniaxial retardation films are approximately equivalent to an effective compensation film with its effective slow axis parallel to the effective compensation film surface thereof.

20. The transflective liquid crystal display of claim 18, wherein the effective phase retardation δ of the compensation film set is in the range of $(\delta_0 - 0.2\pi) \leq \delta \leq (\delta_0 - 0.2\pi)$ with $\delta_0$ satisfies the equation (c):

$$\delta_0 = a\tan\left(\frac{\sin^2\phi + \cos2\alpha\cos^2\phi}{\sin\alpha\sin2\theta\sin2\phi + \sin2\alpha\cos2\theta\cos^2\phi}\right), \quad (c)$$

where the effective slow axis angle θ of the compensation film set is in the range of $0° \leq \theta \leq 180°$.

21. The transflective liquid crystal display of claim 18, wherein the linear polarizer forms an angle β in reference to the first rubbing direction of the top substrate and β angle is in the range of $(\beta_0 - 20° + n \cdot 90°) \leq \beta \leq (\beta_0 + 20° + n \cdot 90°)$, where n is an integer, with $\beta_0$ satisfies the equation (d):

$$\beta_0 = \theta + \frac{1}{2}a\tan\left(-\frac{\sin^2\phi + \cos2\alpha\cos^2\phi}{\sin\delta_0(\sin\alpha\cos2\theta\sin2\phi - \sin2\alpha\sin2\theta\cos^2\phi)}\right), \quad (d)$$

where the effective slow axis angle θ of the compensation film set is in the range of $0° \leq \theta \leq 180°$ and δ is obtained from Equation (c):

$$\delta_0 = a\tan\left(\frac{\sin^2\phi + \cos2\alpha\cos^2\phi}{\sin\alpha\sin2\theta\sin2\phi + \sin2\alpha\cos2\theta\cos^2\phi}\right), \quad (c)$$

where the effective slow axis angle θ of the compensation film set is in the range of $0° \leq \theta \leq 180°$.

22. The transflective liquid crystal display of claim 18, wherein the twisted nematic liquid crystal layer includes a twist angle ranging from approximately negative 90 degrees to positive 90 degrees, wherein the negative twist angle is a right-handedness twist sense and the positive twist angle is a left handedness twist sense.

* * * * *